US00RE50076E

(19) United States
(12) Reissued Patent
Oh et al.

(10) Patent Number: US RE50,076 E
(45) Date of Reissued Patent: Aug. 13, 2024

(54) LIQUEFIED GAS CARRIER

(71) Applicant: HYUNDAI HEAVY INDUSTRIES CO., LTD., Ulsan (KR)

(72) Inventors: Min Seok Oh, Ulsan (KR); Min Jae Kwon, Ulsan (KR); Jong Pil Ha, Ulsan (KR); Hyuk Jang Kwon, Ulsan (KR); Kang Su Nam, Ulsan (KR); Hyung Cheol Shin, Ulsan (KR)

(73) Assignee: HYUNDAI HEAVY INDUSTRIES CO., LTD., Ulsan (KR)

(21) Appl. No.: 17/228,325

(22) Filed: Apr. 12, 2021

Related U.S. Patent Documents

Reissue of:
(64) Patent No.: 10,526,052
Issued: Jan. 7, 2020
Appl. No.: 15/771,836
PCT Filed: Dec. 26, 2016
PCT No.: PCT/KR2016/015289
§ 371 (c)(1),
(2) Date: Apr. 27, 2018
PCT Pub. No.: WO2017/074166
PCT Pub. Date: May 4, 2017

(30) Foreign Application Priority Data

Dec. 30, 2015 (KR) ..... 10-2015-0190197
Feb. 16, 2016 (KR) ..... 10-2016-0017623

(51) Int. Cl.
*B63B 11/02* (2006.01)
*B63B 3/16* (2006.01)
(Continued)

(52) U.S. Cl.
CPC ..... *B63B 25/14* (2013.01); *B63B 3/16* (2013.01); *B63B 3/26* (2013.01); *B63B 11/02* (2013.01);
(Continued)

(58) Field of Classification Search
CPC ..... F17C 2270/0105; B63B 17/0027; B63B 25/14; B63B 2025/087; B63B 11/04
(Continued)

(56) References Cited

U.S. PATENT DOCUMENTS 1,111,740 A * 9/1914 Frear ..... B63B 25/02 114/74 R
3,111,925 A * 11/1963 Hayashi ..... B63B 83/10 114/65 R
(Continued)

FOREIGN PATENT DOCUMENTS

CN 1906080 1/2007
CN 1906080 A 1/2007
(Continued)

OTHER PUBLICATIONS

Office Action issued by the Chinese Patent Office for the Chinese Patent Application No. 201680063001.8 on Apr. 4, 2019.
(Continued)

*Primary Examiner* — Russell D Stormer
(74) *Attorney, Agent, or Firm* — IP & T GROUP LLP

(57) ABSTRACT

The present invention relates to a liquefied gas carrier having a width of less than 32.3 m to pass through the old Panama Canal, which includes a liquefied gas tank having a liquefied gas storage capacity of 70K or more, preferably 78.7K.

7 Claims, 17 Drawing Sheets

(51) Int. Cl.

| | |
|---|---|
| ***B63B 3/26*** | (2006.01) |
| ***B63B 25/14*** | (2006.01) |
| ***B63B 25/16*** | (2006.01) |
| *B63B 11/04* | (2006.01) |

(52) U.S. Cl.
CPC ..... *B63B 25/16* (2013.01); *B63B 11/04* (2013.01); *F17C 2223/0153* (2013.01); *F17C 2270/0105* (2013.01)

(58) Field of Classification Search
USPC ..... 114/74 R, 74 T, 74 A, 97, 121, 125, 182
See application file for complete search history.

(56) References Cited

U.S. PATENT DOCUMENTS

| | | | | | |
|---|---|---|---|---|---|
| 3,162,169 | A * | 12/1964 | Ferris | B63B 11/04 | 114/65 R |
| 3,229,473 | A * | 1/1966 | Schumacher | F17C 3/025 | 62/53.2 |
| 3,265,028 | A * | 8/1966 | Matsuse | B63B 83/10 | 114/77 A |
| 3,326,167 | A * | 6/1967 | Alexander | F17C 3/025 | 114/74 A |
| 3,332,386 | A * | 7/1967 | Massac | F17C 3/025 | 220/560.07 |
| 3,406,650 | A * | 10/1968 | Miller | B63B 83/10 | 114/77 R |
| 3,712,330 | A * | 1/1973 | Davis | B67D 9/02 | 137/340 |
| 4,345,861 | A * | 8/1982 | Aarseth | B63B 25/16 | 114/74 A |
| 5,347,943 | A * | 9/1994 | Fujita | B63B 25/082 | 114/74 R |
| 5,697,312 | A * | 12/1997 | Gustafsson | B63B 25/12 | 220/584 |
| 6,267,069 | B1 * | 7/2001 | Keehan | B63B 11/04 | 220/901 |
| 7,287,389 | B2 * | 10/2007 | Feger | B63J 3/02 | 62/53.2 |
| 7,610,869 | B2 * | 11/2009 | Thomas | B63B 27/24 | 414/137.1 |
| 8,590,472 | B2 * | 11/2013 | Biaggi | B63B 27/34 | 114/230.1 |
| 9,016,222 | B2 * | 4/2015 | Kim | B63B 25/16 | 114/74 A |
| 2007/0054271 | A1 | 3/2007 | Polyak et al. | | |
| 2007/0292243 | A1 * | 12/2007 | De Baan | B63B 27/24 | 414/141.3 |
| 2009/0194011 | A1 * | 8/2009 | Kim | B63B 3/20 | 114/121 |
| 2010/0162939 | A1 * | 7/2010 | Morimoto | B63B 25/16 | 114/74 R |
| 2012/0308437 | A1 | 12/2012 | Zhou et al. | | |
| 2014/0224169 | A1 * | 8/2014 | Morimoto | F17C 13/082 | 114/74 R |
| 2016/0318585 | A1 * | 11/2016 | Knutsen | B63B 27/34 | |
| 2017/0023577 | A1 | 1/2017 | Mulligan et al. | | |

FOREIGN PATENT DOCUMENTS

| | | | |
|---|---|---|---|
| CN | 101804850 | | 8/2010 |
| CN | 101804850 | A | 8/2010 |
| CN | 102259688 | | 11/2011 |
| CN | 102259688 | A | 11/2011 |
| JP | 63-284090 | | 11/1988 |
| JP | 63-284090 | A | 11/1988 |
| JP | 06-023895 | U | 3/1994 |
| JP | 6-035798 | | 5/1994 |
| JP | 6-298173 | | 10/1994 |
| JP | 07-196074 | A | 8/1995 |
| JP | 09-024891 | | 1/1997 |
| JP | 09-024891 | A | 1/1997 |
| JP | 2771091 | | 4/1998 |
| JP | 3051184 | U | 5/1998 |
| JP | 2003-252287 | A | 9/2003 |
| JP | 2005-219677 | A | 8/2005 |
| JP | 2007-062550 | A | 3/2007 |
| JP | 2010-076490 | | 4/2010 |
| JP | 2010-076490 | A | 4/2010 |
| JP | 2011-148358 | | 8/2011 |
| JP | 2011-148358 | A | 8/2011 |
| JP | 2012-521929 | | 9/2012 |
| JP | 2012-521929 | A | 9/2012 |
| JP | 2013-039866 | | 2/2013 |
| JP | 2014-113874 | | 6/2014 |
| JP | 2014-113874 | A | 6/2014 |
| JP | 2014-218238 | | 11/2014 |
| JP | 2015-057600 | | 3/2015 |
| JP | 2016-048232 | | 4/2016 |
| KR | 10-2003-0032809 | | 4/2003 |
| KR | 10-2003-0042415 | | 5/2003 |
| KR | 10-2006-0135823 | A | 12/2006 |
| KR | 100760107 | | 9/2007 |
| KR | 10-2011-0049485 | A | 5/2011 |
| KR | 200456049 | | 10/2011 |
| KR | 10-2012-0021761 | A | 3/2012 |
| KR | 10-2012-0098992 | | 9/2012 |
| KR | 10-2012-0131302 | A | 12/2012 |
| KR | 10-2013-0014166 | A | 2/2013 |
| KR | 10-2013-0072937 | A | 7/2013 |
| KR | 10-2014-0025700 | A | 3/2014 |
| KR | 1020140052378 | | 5/2014 |
| KR | 1020140056271 | | 5/2014 |
| KR | 1020140061671 | | 5/2014 |
| KR | 10-2014-0070775 | A | 6/2014 |
| KR | 10-2014-0075285 | A | 6/2014 |
| KR | 10-2014-0129645 | A | 11/2014 |
| KR | 10-2014-0132867 | A | 11/2014 |
| KR | 10-2014-0144827 | A | 12/2014 |
| KR | 1020140144797 | | 12/2014 |
| KR | 101536873 | | 7/2015 |
| KR | 1020150083254 | | 7/2015 |
| KR | 101554896 | | 9/2015 |
| KR | 10-1705185 | | 2/2017 |

OTHER PUBLICATIONS

Office Action issued by the Japanese Patent Office for Japanese Patent Application No. 2018-542096 on May 7, 2019.

Notice of Allowance by the Korean Patent Office for Korean Patent Application No. 10-2016-0075215 on May 3, 2021.

Notice of Allowance by the Korean Patent Office for Korean Patent Application No. 10-2016-0075228 on Apr. 22, 2021.

Notice of Allowance by the Korean Patent Office for Korean Patent Application No. 10-2016-0075239 on Apr. 22, 2021.

Office Action by the Korean Patent Office for Korean Patent Application No. 10-2016-0110098 on Jun. 5, 2021.

Office Action by the Korean Patent Office for Korean Patent Application No. 10-2017-0115957 on Apr. 19, 2019.

Office Action issued by the Korea Intellectual Property Office dated Apr. 19, 2019.

Office Action issued by the China Intellectual Property Office dated Apr. 4, 2019.

Solvang Returns to HHI for LPG Carrier Duo, Sep. 7, 2015, World Maritime News.

Office Action issued by the Japanese Intellectual Property Office dated May 7, 2019.

Kim, Y. et al, Ribosomal protein S3 is secreted as a homodimer in cancer cells, Biochemical and Biophysical Research Communications, 2013, pp. 805-808, vol. 441.

Zong, C. et al, Chemiluminescence Imaging Immunoassay of Multiple Tumor Markers for Cancer Screening, Analytical Chemistry, 2012, pp. 2410-2415, vol. 84, American Chemical Society.

Trnavsky, M. et al, Surface plasmon-coupled emission for applications in biomedical diagnostics, Dublin City University for the Degree of Doctor of Philosophy, Jul. 2009, pp. 1-117.

(56) References Cited

OTHER PUBLICATIONS

Thiha, A. et al, A Colorimetric Enzyme-Linked Immunosorbent Assay (ELISA) Detection Platform for a Point-of-Care Dengue Detection System on a Lab-on-Compact-Disc, Sensors, 2015, pp. 11431-11441, vol. 15.
Sanjay, S. T. et al, Biomarker detection for disease diagnosis using cost-effective microfluidic platforms, Analyst (2015), pp. 7062-7081, vol. 140, No. 21, The Royal Society of Chemistry.
Notice of Allowance issued by the Korean Intellectual Property Office dated Jun. 28, 2019.

* cited by examiner

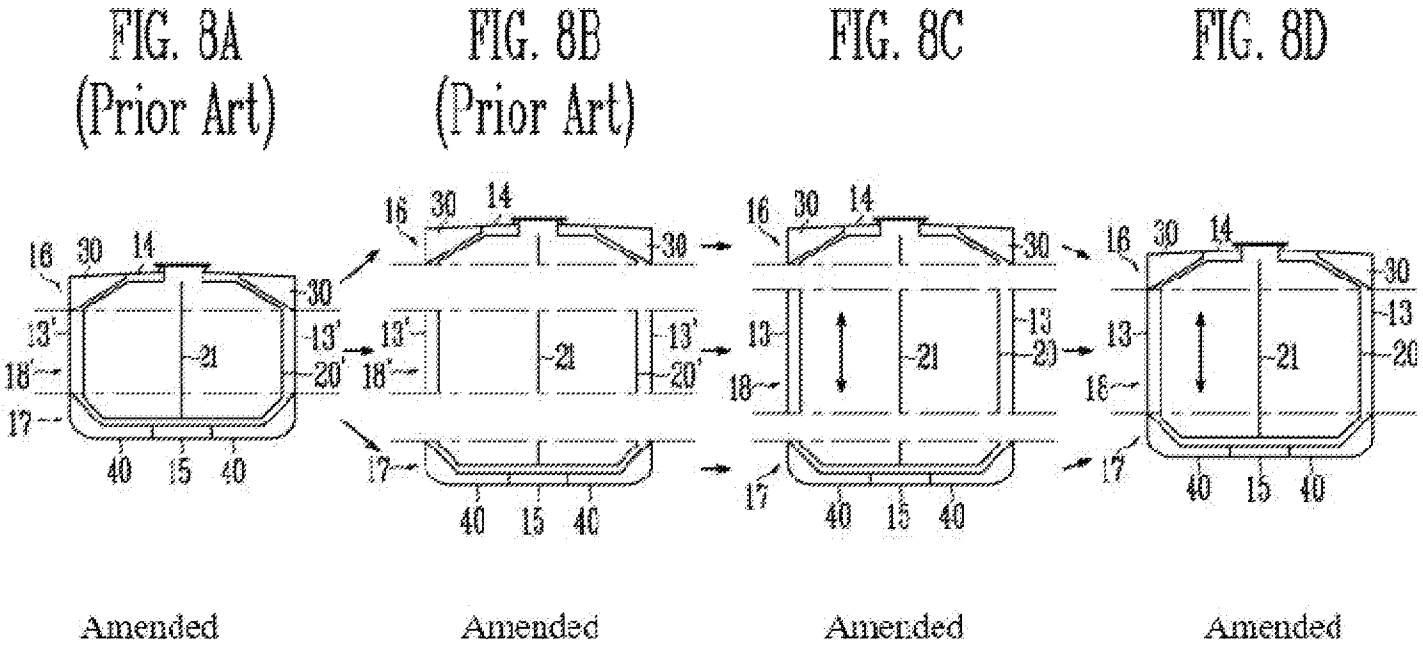
FIG. 8A
(Prior Art)
FIG. 8B
(Prior Art)
FIG. 8C
FIG. 8D
Amended
Amended
Amended
Amended

LIQUEFIED GAS CARRIER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a national stage application of PCT/KR2016/015289 filed on Dec. 26, 2016, which claims Korean patent application number 10-2015-0190197 filed on Dec. 30, 2015 and Korean patent application number 10-2016-0017623 filed on Feb. 16, 2016. The disclosure of each of the foregoing applications is incorporated herein by reference in its entirety.

TECHNICAL FIELD

The present invention relates a liquefied gas carrier.

BACKGROUND ART

Liquefied petroleum gas (LPG) is a fuel liquefied by cooling or pressurizing gas components extracted together with crude oil from an oil field when petroleum is drilled. The LPG includes propane and butane as main ingredients, and has a calorific value higher than those of other fuels.

The LPG is easily liquefied or evaporated, and the volume of the LPG is decreased when the state of the LPG is changed from a gas state to a liquid state. The boiling point of the LPG is about −42° C. When the LPG is liquefied at a room temperature, a volume of propane and a volume of butane in the LPG are decreased by 1/260 and 1/230, respectively, so that the LPG can be conveniently stored and carried.

The LPG is carried by a vessel (particularly, an LPG carrier) from an area of production to an area of consumption. At this time, the vessel has a plurality of liquefied gas storage tanks, and the LPG may be accommodated in a low-temperature liquid state in the liquefied gas storage tanks.

Meanwhile, the vessel supporting the liquefied gas storage tanks may sails along various routes. When a canal exists on a route of the vessel, specifications of the vessel may be limited depending on the size of the canal.

As an example, when the vessel should pass through the old Panama Canal, the width of the vessel cannot exceed 32.3 m, and vessels capable of passing through the old Panama Canal are called as Panamax vessels. However, the new Panama Canal that allows vessels having widths up to 49 m to pass therethrough has recently been opened. Vessels capable of passing through the new Panama Canal are called as new Panamax vessels, and the existing Panamax vessels are called as post Panamax vessels.

The width of a vessel is limited as described above such that the vessel passes through the old Panama Canal. In this case, the total capacity of liquefied gas to be loaded in the vessel cannot help being limited. Hence, only carriers in which the total capacity of liquefied gas is 60K or so sail for the purpose of their safe sailing.

DISCLOSURE

Technical Problem

The present invention is conceived to solve the aforementioned problems. Accordingly, an object of the present invention is to provide a liquefied gas carrier capable of further increasing freight capacity while passing through the old Panama Canal.

Technical Solution

According to an aspect of the present invention, there is provided a liquefied gas carrier having a width of less than 32.3 m to pass through the old Panama Canal, the liquefied gas carrier including a liquefied gas tank having a liquefied gas storage capacity of 70K or more, preferably 78.7K.

Specifically, the liquefied gas tank may be provided in plurality.

Specifically, the liquefied gas carrier may include a body accommodating the liquefied gas tank, and the height of the body may be 22 m to 23.5 m.

Specifically, the liquefied gas carrier may include a body accommodating the liquefied gas tank, and a shell of the body may be provided in a single hull.

Specifically, the liquefied gas tank may include an upper part, a central part, and a lower part, and the vertical length of the central part may be larger than the sum of the vertical length of the upper part and the vertical length of the lower part.

Specifically, the liquefied gas tank may include a first liquefied gas tank disposed at a bow, and the first liquefied gas tank may have at least two bending parts.

Specifically, the liquefied gas tank may include an upper part, a central part, and a lower part, and the vertical length of the central part of the liquefied gas tank may be formed to further extend than that of a central part of a liquefied gas tank of a liquefied gas carrier having a liquefied gas storage capacity of less than 70K.

Specifically, the vertical lengths of the upper part and the lower part of the liquefied gas tank may be formed equal to those of an upper part and a lower part of a liquefied gas tank of a liquefied gas carrier having a liquefied gas storage capacity of less than 70K.

Specifically, the liquefied gas carrier may include a body accommodating the liquefied gas tank, and the liquefied gas tank may be disposed to be spaced apart from the shell of the body at 1.4 m or more.

According to another aspect of the present invention, there is provided a liquefied gas carrier having a width of less than 32.3 m to pass through the old Panama Canal, wherein the liquefied gas carrier has a liquefied gas storage capacity of 70K or more, preferably 78.7K by increasing the height of a body.

Advantageous Effects

In the liquefied gas carrier according to the present invention, the shape of the body is modified while having a width where the liquefied gas carrier can pass through the old Panama Canal, so that a liquefied gas storage capacity of 70K or more can be secured. Further, the structural stability of the liquefied gas carrier can be enhanced by improving the shape of the body, the internal structure of the body, and the like are.

BRIEF DESCRIPTION OF THE DRAWINGS

[FIG. 8 is a horizontal sectional exploded view of the liquefied gas carrier according to the present invention.]

*FIG. 8A is a side sectional view of a conventional liquefied gas carrier.*

*FIG. 8B is an exploded side sectional view of the liquefied gas carrier of FIG. 8A.*

*FIG. 8D is a side sectional view of a liquefied gas carrier according to an embodiment of the present invention.*

*FIG. 8C is an exploded side sectional view of the liquefied gas carrier of FIG. 8D.*

MODE FOR THE INVENTION

Hereinafter, exemplary embodiments of the present invention will be described in detail with reference to the accompanying drawings. In the present invention, liquefied gas may be used as a meaning including liquefied petroleum gas, liquefied natural gas, and the like.

Figure 1:
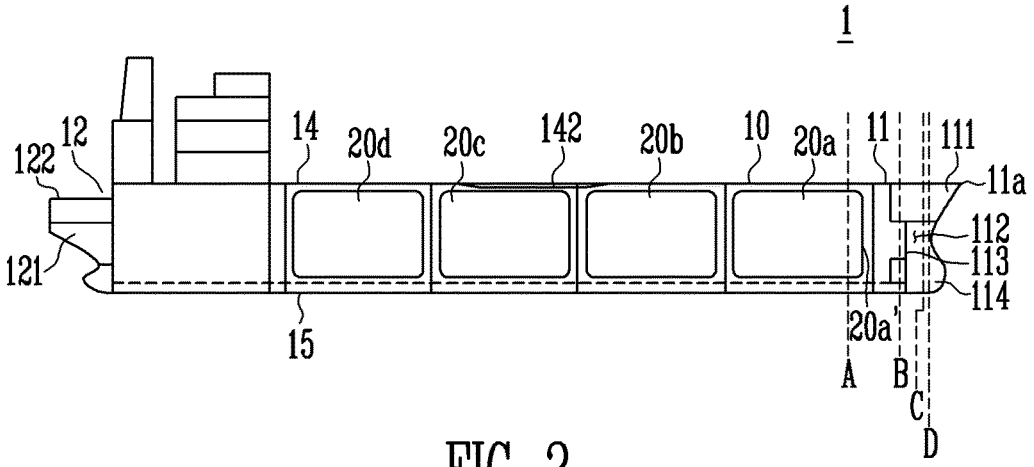
FIG. 1 is a side view of a liquefied gas carrier according to the present invention.

FIG. 1 is a side view of a liquefied gas carrier according to the present invention.

Figure 2:
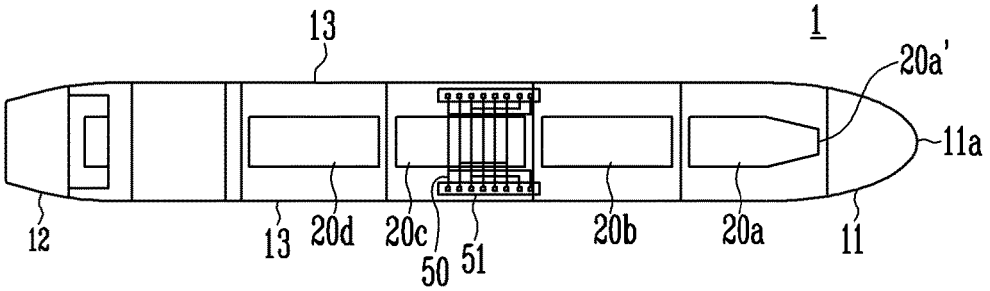
FIG. 2 is a plan view of the liquefied gas carrier according to the present invention.
Figure 3:
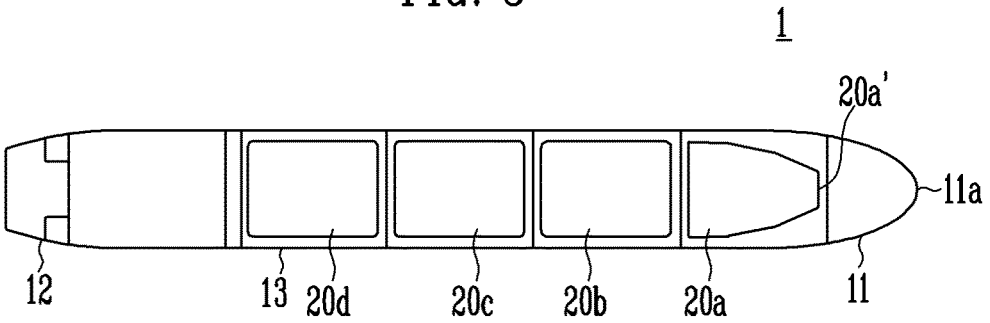
FIG. 3 is a horizontal sectional view of the liquefied gas carrier according to the present invention.

FIG. 2 is a plan view of the liquefied gas carrier according to the present invention. FIG. 3 is a horizontal sectional view of the liquefied gas carrier according to the present invention.

Figure 4:
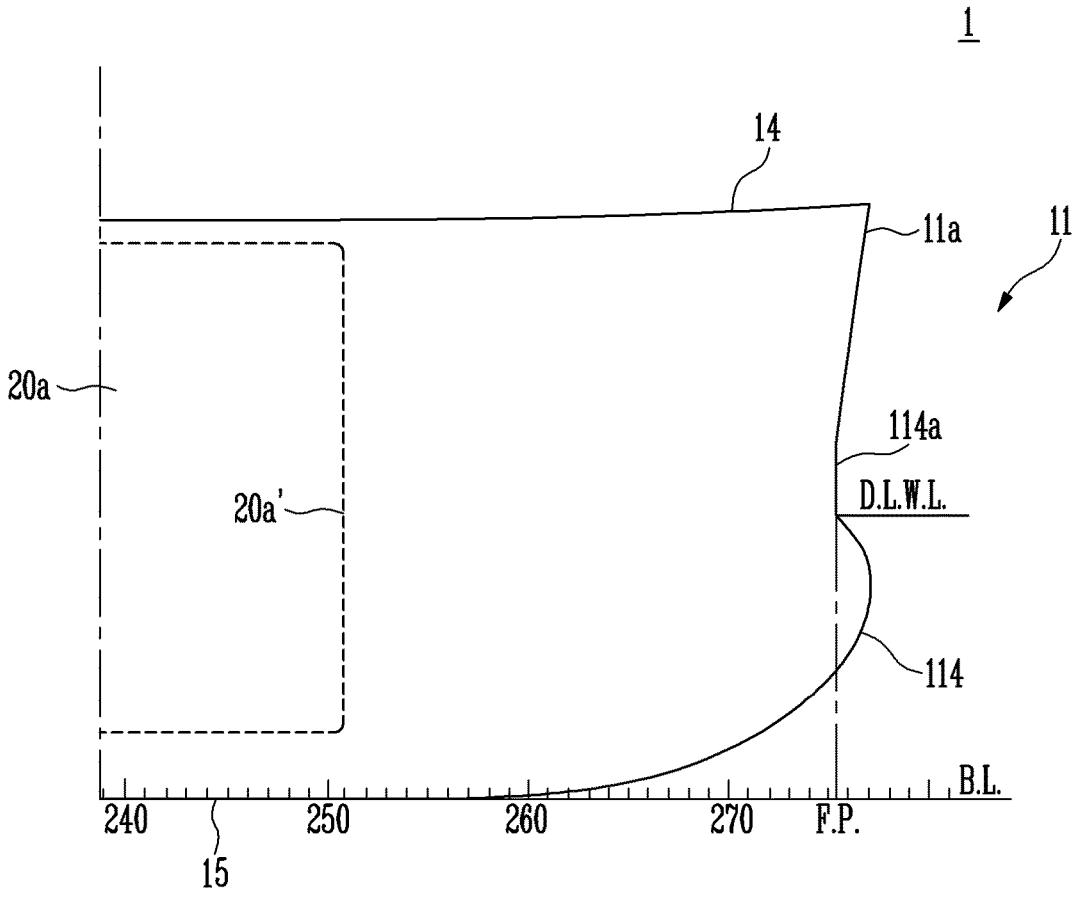
FIG. 4 is a side view of a bow of the liquefied gas carrier according to the present invention.

FIG. 4 is a side view of a bow of the liquefied gas carrier according to the present invention.

Figures 5A, 5B, 5C, 5D:
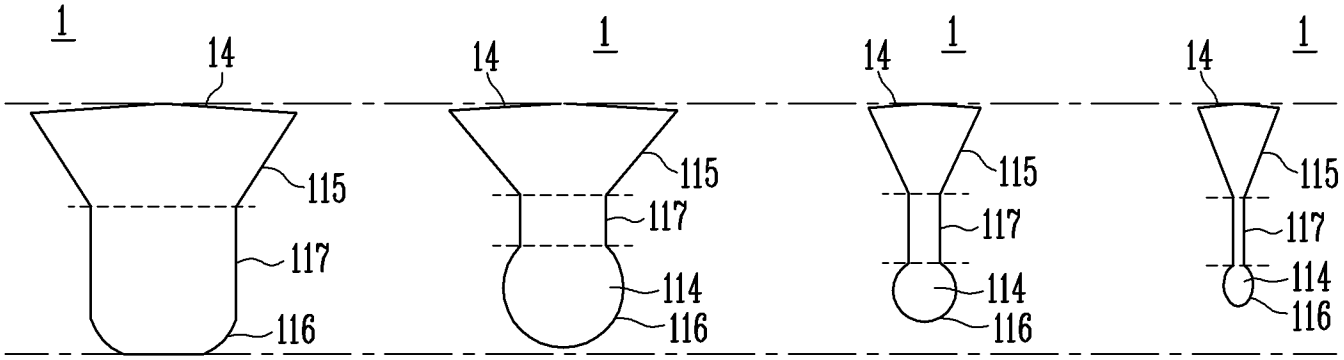
FIG. 5 illustrates cross-sectional views at A to D of FIG. 1.
Figure 6:
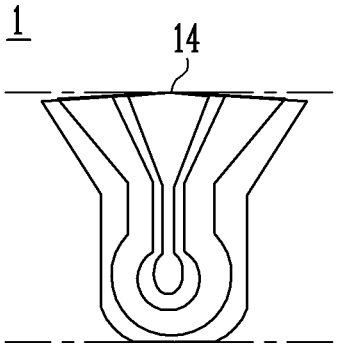
FIG. 6 is a front sectional view illustrating the cross-sectional views of the liquefied gas carrier, which overlap with one another.

FIG. 5 illustrates cross-sectional views at A to D of FIG. 1. FIG. 6 is a front sectional view illustrating the cross-sectional views of the liquefied gas carrier, which overlap with one another.

Figure 7:
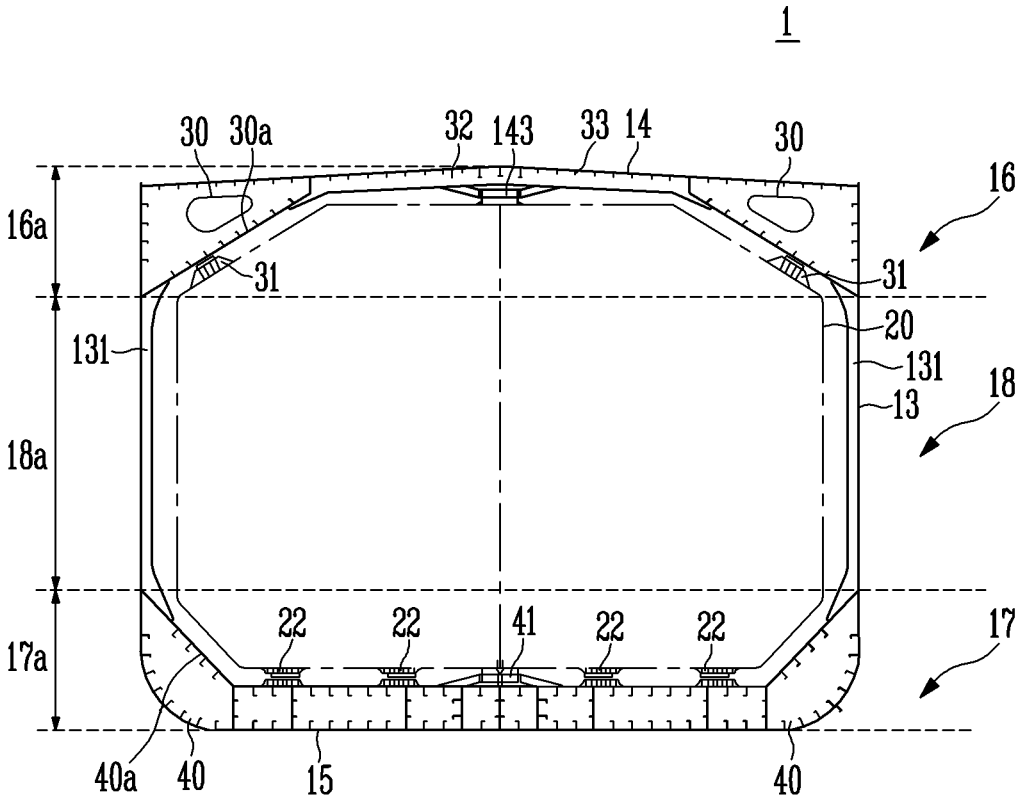
FIG. 7 is a front sectional view of a liquefied gas carrier according to a first embodiment of the present invention.

FIG. 7 is a front sectional view of a liquefied gas carrier according to a first embodiment of the present invention. [FIG. 8 is a horizontal sectional exploded view of the liquefied gas carrier according to the present invention.]

*FIG. 8A is a side sectional view of a conventional liquefied gas carrier. FIG. 8B is an exploded side sectional view of the liquefied gas carrier of FIG. 8A. FIG. 8D is a side sectional view of a liquefied gas carrier according to an embodiment of the present invention. FIG. 8C is an exploded side sectional view of the liquefied gas carrier of FIG. 8D.*

Referring to FIGS. 1 to 8, the liquefied gas carrier 1 according to the first embodiment of the present invention includes a body 10, and a liquefied gas tank 20 accommodated in the body 10, the liquefied gas tank 20 being provided in plurality, the liquefied gas tank 20 storing liquefied gas.

The body 10 has a bow 11 at the front and a stern 12 at the rear in the length direction thereof. In addition, when viewed in the transverse direction, an upper deck 14 may be provided at an upper end of the body 10, side shells 13 may be provided at both left and right sides of the body 10, and a lower end of the body 10 may be defined as a bottom 15.

Hereinafter, in this specification, the term "front" or "rear" refers to the front or rear in the length direction (longitudinal direction), and the term "left" or "right" refers to the left side (portside) or right side (starboard) in the width direction (transverse direction).

A bulbous bow 114 may be provided at the bow 11 of the body 10. The bulbous bow 114 is a spherical structure protruding to the front so as to reduce wave-making resistance, and an upper side of the bulbous bow 114 may be recessed backward.

That is, a spot recessed backward is formed between the bulbous bow 114 and the upper deck 14, and a draft line may be located at the spot. In this case, a bow wave flows along the side shell 13 while splitting along the surface of the bulbous bow 114.

The bow 11 of the body 10 according to the present invention, as shown in FIGS. 5 and 6, may be configured with an upper part 115, a lower part 116, and a central part 117, based on one section of the body 10 in the transverse direction. The upper part 115 refers to a certain part downward from the upper deck 14, the lower part 116 refers to a certain part upward from the bottom 15, and the central part 117 refers to a part between the upper part 115 and the lower part 116.

The upper part 115 of the bow 11 may include a portion of which lateral width decreases downward from the upper deck 14. At this time, the upper deck 14 may have a slope where its height decreases from the center to both sides of the body 10, and therefore, the shape of the upper part 115 on a cross section may be a rhombus shape. For reference, the slope of the upper deck 14 may be constant backward from a front end 11a of the body 10. Here, the front end 11a may be included between the upper and lower ends of the body 10.

The height of the upper part 115, i.e., the height from the upper deck 14 to the lower end of the upper part 115 may be varied from the front to the rear. Therefore, the height of the central part 117 may also be varied from the front to the rear.

The lower part 116 may include a portion at which the bulbous bow 114 is provided upward from the bottom 15. The lower part 116 may have a shape of which lateral width increases as compared with the central part 117, which results from the sectional shape of the bulbous bow 114.

The central part 117 is provided between the upper part 115 and the lower part 116, and has a shape of which lateral width is constant between the upper and lower ends thereof.

The central part 117 may have a shape of which lateral width increases backward from the front end 11a of the body 10 (D→C→B→A in FIG. 5) while having a certain lateral width between the upper and lower ends thereof. Also, the height of the central part 117 may be varied backward from the front end 11a of the body 10. Specifically, the central part 117 may have a shape in which the height of the upper end gradually increases and then decreases backward from the front end 11a of the body 10 and the height of the lower end gradually increases backward from the front end 11a of the body 10. It will be apparent that the heights of the upper and lower ends of the central part 117 may be variously changed in addition to those mentioned above.

On one section of the body 10 in the transverse direction, the maximum lateral width of the lower part 116 may be equal to or larger than the lateral width of the central part 117. This is because the bulbous bow 114 protruding forward is included in the lower part 116 (see B, C, and D of FIG. 5). However, the difference between the maximum lateral width of the lower part 116 and the lateral width of the central part 117 may disappear while gradually increasing and then decreasing backward from the front end 11a of the body 10 (see A of FIG. 5).

The maximum lateral width of the lower part 116 may be the maximum lateral width that the bulbous bow 114 has. As the lateral width of the central part 117 increases backward from the front end 11a of the body 10, the lateral width of the central part 117 may be increased by the lateral width of the bulbous bow 114. After all, as shown in D of FIG. 5, the lateral width of the central part 117 and the maximum lateral width of the lower part 116 are equal to each other, and may be continuously formed.

A plurality of liquefied gas tanks 20 are provided in the body 10 along the longitudinal direction. The liquefied gas tank 20 may have a longitudinal wall 21 for preventing sloshing therein, and a first liquefied gas tank 20a, a second liquefied gas tank 20b, a third liquefied gas tank 20c, and a fourth liquefied tank 20d may be provided from the front to the rear. At this time, the first liquefied gas tank 20a provided at the frontmost portion among the liquefied gas tanks 20 may have a shape of which lateral width decreases from the rear end to the front end thereof. This is because the bow 11 has a shape of which lateral width decreases toward the front end 11a. In this case, the slope where the lateral width of the first liquefied gas tank 20a decreases may increase from the rear end to the front end of the first liquefied gas tank 20a. For example, as shown in FIG. 3, a side surface of the first liquefied gas tank 20a may have a bending part (not shown) at which the side surface is bent twice such that the angle of inclination increases.

In the present invention, it is very important for the liquefied gas carrier 1 to secure a sufficient liquefied gas storage capacity. However, since the lateral width of the bow 11 is very narrow, it is difficult to dispose the liquefied gas tank at the bow 11. Hence, the front end 11a of the bow 11 and a front end 20a' of the first liquefied gas tank 20a are disposed to be spaced apart from each other at a considerable length.

However, when the front end 20a' of the first liquefied gas tank 20a and the front end 11a of the bow 11 are spaced apart from each other, the length of a portion at which the liquefied gas tank 20 can be installed decreases as compared with the length of the body 10 in the longitudinal length, and a decrease in liquefied gas storage capacity is caused by the decreased length. Thus, in the present invention, the bow 11 is improved as described above so as to prevent a decrease in liquefied gas storage capacity.

In the present invention, the bulbous bow 114 is provided, and the central part 117 may have a narrow lateral width between the upper deck 14 and the bulbous bow 114. Therefore, it is difficult for the first liquefied gas tank 20a to be directly disposed at the front end 11a of the bow 11. However, in the present invention, when the lateral width of a cross section of the body 10, particularly, the lateral width of the central part 117 is sufficiently enlarged, the first liquefied gas tank 20a may be disposed adjacent to the front end 11a of the body 10.

Thus, in the present invention, the shape of the central part 117 has a cross section of which lateral width is constant while having vertical left and right sides, and the lateral width of the central part 117 can increase backward from the front thereof.

At this time, at a spot where the maximum lateral width of the lower part 116 and the lateral width of the central part 117 correspond to each other, the lateral width of the central part 117 increases sufficiently enough to accommodate the front end 20a' of the first liquefied gas tank 20a as described above, and therefore, the front end 20a' of the first liquefied gas tank 20a may line up with the corresponding spot or may be located at the back of the corresponding spot.

In this case, the minimum front-rear length between the front end 20a' of the first liquefied gas tank 20a and the front end 11a of the body 10 may be 19 to 21 m (preferably, 19.48 to 20.28 m). This is remarkably reduced as compared with liquefied gas carriers having a liquefied gas storage capacity of less than 70K, which pass through the old Panama Cannel.

Also, in the present invention, the protrusion length of the bulbous bow 114 can be improved such that the front end 20a' of the first liquefied gas tank 20a is not spaced apart from the front end 11a of the body 10 at a large distance but disposed adjacent to the front end 11a of the body 10.

As an example, based on a spot 114a recessed backward between the upper deck 14 and the bulbous bow 114, the front-rear length from the corresponding spot 114a to the front end of the bulbous bow 114 may be 1 to 2 m (preferably, 1.5 m or so). When the front-rear length of the bulbous bow 114 decreases, the front-rear length from the front end 11a of the bow 11 to the spot where the maximum lateral width of the lower part 116 and the lateral width of the central part 117 corresponds to each other may also decrease.

Thus, in the present invention, the separation space from the front end 11a of the bow 11 to the front end 20a' of the first liquefied gas tank 20a decreases, so that the length of a portion that can be occupied by the liquefied gas tank 20 increases with respect to the length of the body 10 in the longitudinal direction, thereby increasing the liquefied gas storage capacity.

As this time, from the side view of the bow 11, the recessed spot 114a may be vertically provided by a certain height. In addition, the front end 11a of the bow 11 is provided at the recessed spot 114a to be forwardly inclined toward the upper deck 14. The inclined angle may be 5 to 10 degrees (preferably, 7 degrees).

The front end of the bulbous bow 114, unlike that shown in FIG. 1, may line up with the front end of the upper deck 14, or further protrude than the front end of the upper deck 14. This may be variously determined according to sea conditions of a region in which the liquefied gas carrier 1 according to the present invention sails.

In particular, the liquefied gas carrier 1 according to the present invention may sail on a route where it passes through the old Panama Canal. In this case, the maximum width of the body 10 may be less than 32.3 m such that the liquefied gas carrier 1 according to the present invention passes through the old Panama Canal.

Meanwhile, liquefied gas carriers (post Panamax) capable of passing through the old Panama Canal generally have a liquefied gas storage capacity of less than 70K.

However, in the present invention, the body 10 may be modified to have a liquefied gas storage capacity of 70K or more (preferably, 78.7K) while passing through the old Panama Canal. Hereinafter, this will be described in detail with reference to FIGS. 7 and 8.

As shown in FIGS. 7 and 8, the liquefied gas carrier 1 is configured with a body 10, a liquefied gas tank 20 provided in the body 10, and the like. The liquefied gas carrier 1 may be divided into an upper part 16, a central part 18, and a lower part 17 by virtual lines. At this time, the upper part 16, the central part 18, and the lower part 17 are concepts obtained by virtually dividing the liquefied gas carrier 1 including all of the body 10, the liquefied gas tank 20, and the like according to heights, and are terms having meanings different from those of the upper part 115, the central part 117, and the lower part 116, which are used to describe the bow 11.

Before each of the upper part 16, the central part 18, and the lower part 17, which constitute the liquefied gas carrier 1, is described, the shapes of additional components (a top side tank 30, a double bottom tank 40, and the like) and the body 10 (particularly, the side shell 13, etc. among shells) will be described in detail.

In the present invention, the top side tank 30 may be installed at the upper end of the side shell 13, and the double bottom tank 40 may be installed at the lower end of the side shell 13.

At this time, both of the top side tank 30 and the double bottom tank 40 may be used as water ballast tanks. The top side tank 30 is located upwardly from the double bottom tank 40, and hence ballast water may be preferentially filled in the double bottom tank 40 as compared with the top side tank 30 so as to stably control draft in the liquefied gas carrier 1.

The top side tank 30 may be provided at a spot where the upper end of the side shell 13 and a side end of the upper deck 14 meet each other. The top side tank 30 may have a shape with an approximately triangular cross section. In order to prevent interference with the top side tank 30, an upper corner of the liquefied gas tank 20 may have [a shape cut inclined] *an inclined shape*, and the top side tank 30 and the liquefied gas tank 20 may be spaced apart from each other.

At this time, an anti-floating chock 31 is installed at one surface of the top side tank 30 and/or one surface of the liquefied gas tank 20, which face each other, so that the liquefied gas tank 20 can be prevented from being floated when seawater is introduced into the body 10.

The top side tank 30 is provided in a pair at left and right sides with respect to the center of the body 10. The pair of top side tanks 30 may be connected to each other by a central cross member 32 provided to cross the center of the body 10 in the transverse direction. The central cross member 32 is provided to overlap with the top side tank 30, thereby complementing the strength of an inner end of the top side tank 30.

The double bottom tank 40 allows the bottom 15 to have a double barrier structure, so that seawater can be prevented from being immediately introduced into a space in which the liquefied gas tank 20 is provided even when the bottom 15 is damaged.

A surface 40a of the double bottom tank 40 connected to the side shell 13 may be an inclination surface inclined in a direction opposite to a surface 30a of the top side tank 30, which faces the liquefied gas tank 20. At this time, in order to prevent interference between the double bottom tank 40 and the liquefied gas tank 20, a lower end corner of the liquefied gas tank 20 may have [a shape cut inclined] *an inclined shape*. In addition, the liquefied gas tank 20 and the double bottom tank 40 may be spaced apart from each other.

The side shell 13 may be provided in a single hull to surround the liquefied gas tank 20. That is, when the side shell 13 is pierced at a side surface thereof, seawater may be immediately introduced into the space in which the liquefied gas tank 20 is provided. However, the liquefied gas carrier 1 of the present invention may be a carrier that carries LPG having a storage temperature higher than that of LNG, and hence the liquefied gas tank 20 can have stability even when it is surrounded by the side shell 13 provided in the single hull.

The side shell 13 and the liquefied gas tank 20 may be spaced apart from each other at a certain distance. An inert gas such as nitrogen may be filled in the spaced space so as to prevent the occurrence of fire and explosion when liquefied gas is leaked.

Specifically, the side shell 13 may surround the liquefied gas tank 20 in a state in which it is disposed to be spaced apart from the liquefied gas tank 20 at 1.4 m (preferably, 1.482 m) or more. Also, in order to reinforce the strength of the side shell 13, a stiffener 131 may be provided at an inner surface of the side shell 13 in the vertical direction.

The side shell 13 may have a shape vertical to the cross section, and the side surface of the liquefied gas tank 20 adjacent to the side shell 13 may also have a shape vertical to the cross section. Therefore, the lateral width of the liquefied gas tank 20 may be constant at this portion.

After all, the liquefied tank 20 may have a shape of which lateral width increases from the upper end to the lower end thereof (a portion adjacent to the top side tank 30), is constantly maintained by a certain height (a portion surrounded by only the side shell 13), and then decreases (a portion adjacent to the double bottom tank 40).

The liquefied gas tank 20 may be accommodated between a left side shell 13 and a right side shell 13, and therefore, the storage capacity of the liquefied gas tank 20 can be increased when the distance between the pair of side shells 13 (the width of the body 10) increases. However, in the present invention, the liquefied gas carrier 1 may have a width where it can pass through the old Panama Canal. Therefore, as the distance between the pair of side shells 13 is limited to 32.3 m or less, the lateral width of the liquefied gas tank 20 may also be limited.

However, in the present invention, the liquefied gas carrier 1 having a liquefied gas storage capacity of 70K or more (preferably, 78.7K) can be implemented by increasing the storage capacity of the liquefied gas tank 20 while increasing the height of the liquefied gas tank 20. Hereinafter, this will be described in detail, based on the upper part 16, the central part 18, and the lower part 17, which constitute the liquefied gas carrier 1.

The upper part 16 is a part including the upper deck 14. The upper part 16 may be a part including the height from the upper deck 14 down to the lower end of the top side tank 30. At this time, the lower end of the upper part 16 may be down to the height of a relatively low spot among the lower end of the top side tank 30 and the upper end of the portion of the liquefied gas tank 20, of which lateral width is maximum (a portion of which left/right side is vertical).

The upper part 16 may include a dome (reference numeral is not shown) provided on the upper deck 14 to introduce/discharge liquefied gas into/from the liquefied gas tank 20.

Also, the upper part 16 may include all other components (an engine casing, a deck house, and the like) that can be installed at the upper deck 14. For convenience, in this specification, the entire height of the upper part 16 may be used as a height except components installed at the upper deck 14 to protrude upwardly.

The lower part 17 is a part including the bottom 15, and may be a concept including up to the upper end of the double bottom tank 40. At this time, the upper end of the lower part 17 may be up to the height of a relatively high spot among the upper end of the double bottom tank 40 and the lower end of the portion of the liquefied gas tank 20, of which lateral width is maximum (a portion of which left/right side is vertical).

In this case, the entire height of the lower part 17 may mean a large height between the height from the bottom 15 up to the upper end of the double bottom tank 40 and the height from the bottom 15 up to the lower end of the portion of the liquefied gas tank 20, of which lateral width is maximum.

The central part 18 is provided between the upper part 16 and the lower part 17, and is a part at which left and right side surfaces of the liquefied gas tank 20 are vertically provided. That is, the central part 18 may include a part at which the lateral width of the liquefied gas tank 20 is constantly maintained.

In addition, the side shell 13 may be vertically provided at least between the lower end of the top side tank 30 and the upper end of the double bottom tank 40, and the central part 18 includes a portion of the side shell 13, at which the top side tank 30 and the double bottom tank 40 are not installed. Therefore, a portion of the side shell 13 included in the central part 18 may be vertically provided.

The central part 18 has a relatively large vertical length as compared with the upper part 16 and the lower end 17. In particular, the central part 18 may have a height larger than the sum of the vertical length of the upper part 16 and the vertical length of the lower part 17.

This is because the liquefied gas carrier 1 includes the vertically extending central part 18 while having a width where it can pass through the old Panama Canal. Specifically, referring to [FIG. 8] *FIGS. 8A and 8B*, a liquefied gas carrier that has a liquefied gas storage capacity of less than 70K and can pass through the old Panama Canal is divided into an upper part 16, a central part 18′, and a lower part 17. In the present invention, *as shown in FIGS. 8C to 8D* the total height of the body 10 is increased by vertically extending only the central part 18′ *to central part 18* while equally maintaining the vertical lengths of the upper part 16 and the lower part 17, so that a liquefied gas storage capacity of 70K or more (Preferably, 78.7K) is secured.

Therefore, in the present invention, the height of the central part 18 may be relatively larger than the sum of the vertical length of the upper part 16 and the vertical length of the lower part 17 between the upper deck 14 and the bottom 15.

In the present invention, the body 10 has a height of 23 m to 23.5 m, so that the liquefied gas storage capacity of 70K or more (Preferably, 78.7K) can be secured.

As described above, in this embodiment, the width of the liquefied gas carrier 1 is limited to pass through the old Panama Canal, but the central part 18 is vertically extended within a height of the body 10 is 23.5 m or less, so that the liquefied gas carrier 1 can simultaneously have a liquefied storage capacity of 70K or more and stability.

Hereinafter, a structure surrounding the liquefied gas tank 20 will be described.

Referring back to FIG. 7, the liquefied gas carrier 1 according to the first embodiment of the present invention is provided with a vertical support 22, an anti-rolling chock 41 or 143, the anti-floating chock 31, and the like, to stably accommodate the liquefied gas tank 20.

The vertical support 22 is provided between the liquefied gas tank 20 and the bottom 15, and supports the weight of the liquefied gas tank 20. The vertical support 22 may be provided in plurality, and the plurality of vertical supports 22 may be arranged symmetrically with respect to the center of the body 10.

The anti-rolling chock 41 or 143 is provided between the liquefied gas tank 20 and the bottom 15 and/or the liquefied gas tank 20 and the upper deck 14, and may prevent rotational movement of the liquefied gas tank 20 in the transverse direction when the body 10 moves.

In the present invention, it will be apparent that, like the anti-rolling chock 41 or 143, an anti-pitching chock may be provided to prevent rotational movement of the liquefied gas tank 20 in the longitudinal direction.

The anti-floating chock 31 may prevent floating of the liquefied gas tank 20. In the present invention, the side shell 13 provided in the single hull surrounds the liquefied gas tank 20. When seawater is introduced into the body 10 as the side shell 13 is damaged, the liquefied gas tank 20 may damage the upper deck 14 while being floated by the seawater because the liquefied gas tank has a density smaller than that of the seawater.

Thus, in the present invention, the anti-floating chock 31 is provided at one surface of the top side tank 30, which faces the liquefied gas tank 20, so that an impact can be prevented from being applied to the upper deck 14, etc. when the liquefied gas tank 20 is floated.

The anti-rolling chock 41 or 143 and the anti-floating chock 31, which are described above, may be provided with a spaced gap in a state in which the liquefied gas tank 20 is stably disposed. However, when the liquefied gas tank 20 is rotated or floated, the rotational movement or floating of the liquefied gas tank 20 can be prevented as the spaced gap is narrowed.

The anti-rolling chock 143 may be installed at the central cross member 32. The central cross member 32 may be provided at a lower portion of the upper deck 14 to connect the pair of left and right top side tanks 30. At this time, the anti-rolling chock 143 may be installed at a lower end of the central cross member 32.

The central cross member 32 is provided to reinforce the strength of the upper deck 14 between the pair of top side tanks 30, and a reinforcing member 33 may be added. The reinforcing member 33 may be provided in plurality, and the plurality of reinforcing members 33 may be installed in parallel in a direction (longitudinal direction) vertical to the central cross member 32.

Figure 9:
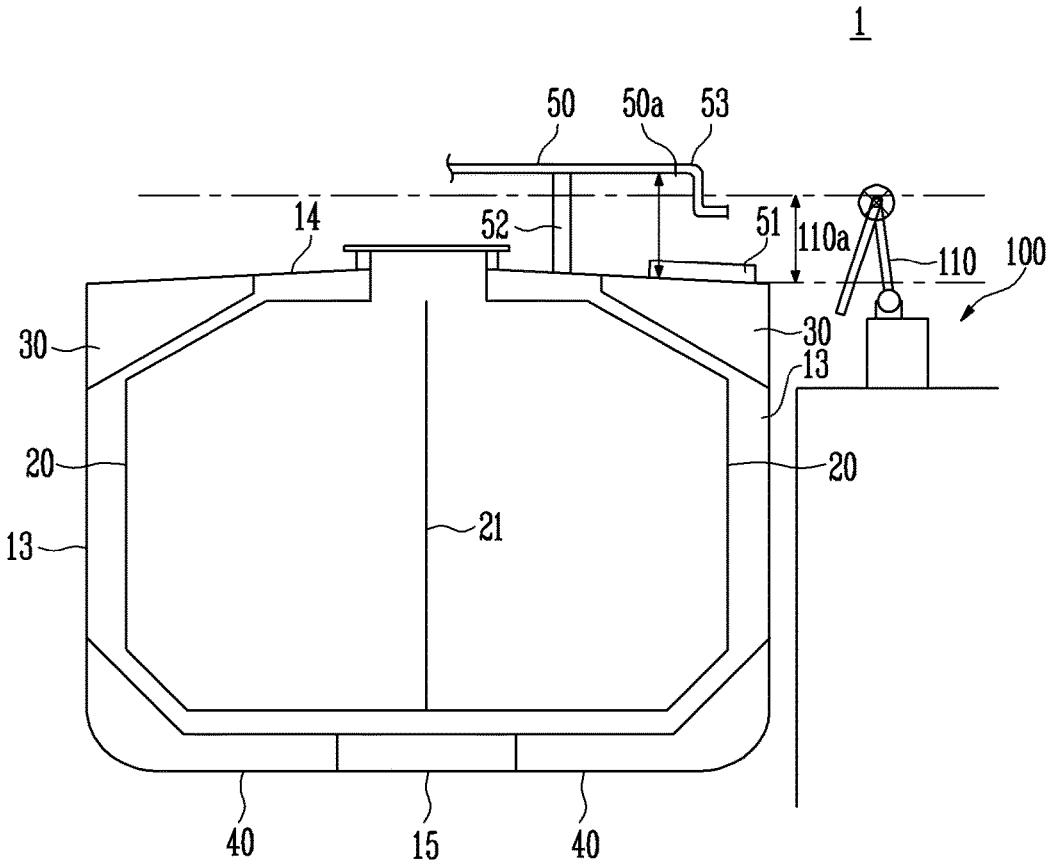
FIG. 9 is a front sectional view of the liquefied gas carrier according to the first embodiment of the present invention.

FIG. 9 is a front sectional view of the liquefied gas carrier according to the first embodiment of the present invention.

Referring to FIG. 9, the liquefied gas carrier 1 according to the first embodiment of the present invention may include a manifold 50 and a drip tray 51.

The manifold 50 may be installed at a position upwardly spaced apart from the upper deck 14 by a support 52, and has a connection end 50a for connecting the manifold 50 to a transfer arm 110 of an exterior 100. The connection end 50a of the manifold 50 has a flange shape, and the manifold 50 may load or unload liquefied gas through the connection end 50a. It will be apparent that the manifold 50 may be connected to the inside of the liquefied gas tank 20 through a separate pipe.

As described above, in the present invention, the height of the upper part 16 is further increased as the central part 18 is vertically extended so as to secure a liquefied gas storage capacity of 75K or more. In this case, the height of the manifold 50 may be increased together with that of the upper part 16, and therefore, the connection end 50a of the manifold 50 may be provided relatively upward from a vertical connectable range 110a of the transfer arm 110.

Accordingly, in the present invention, there occurs a problem in that the connection between the connection end 50a of the manifold 50 and the transfer arm 110 of the exterior is impossible. In order to solve this problem, a height difference adjusting unit 53 may be provided. The height difference adjusting unit 53 connects the connection end 50a of the manifold 50 and the transfer arm 110.

One side of the height difference adjusting unit 53 may be connected to the connection end 50a of the manifold 50, and the other side of the height difference adjusting unit 53 may be connected to the transfer arm 110. As described above, the connection end 50a of the manifold 50 may be located relatively upward from the vertical connectable range 110a of the transfer arm 110, and hence the height of the one side of the height difference adjusting unit 53 may be relatively higher than that of the other side of the height difference adjusting unit 53.

In order to connect different heights, the height different adjusting unit 53 may have a shape that is bent or curved at least once. As an example, the height difference adjusting unit 53 may have an S shape. Also, the height difference adjusting unit 53 may be detachably provided to the manifold 50.

The drip tray 51 is provided downward from the connection end 50a of the manifold 50 on the upper deck 14. The drip tray 51 is a component for collecting liquefied gas leaked when the liquefied gas is transferred, and therefore may be provided downward from a portion (the connection end 50a of the manifold, etc.) at which it is high likely that the liquefied gas will be leaked on a liquefied gas transfer path.

However, in the present invention, the manifold 50 and the transfer arm 110 can be connected to each other, using the height difference adjusting unit 53. Since both of the spot where the height difference adjusting unit 53 and the connection end 50a of the manifold 50 are connected to each other and the spot where the height difference adjusting unit 53 and the transfer arm 110 are connected to each other are spots where it is highly likely that the liquefied gas will be leaked, the drip tray 51 may be installed downward from the spots. That is, the one side and the other side of the height difference adjusting unit 53 may be located upward from the drip tray 51.

In the present invention, the height difference adjusting unit 53 is used to connect the manifold 50 and the transfer arm 110 when the height of the manifold 50 is out of the vertical connectable range 110a of the transfer arm 110 as the central part 18 is vertically extended.

This is because the minimum value of the height between the manifold 50 and the drip tray 51 is defined by a classification class (e.g., 900 mm). That is, the height between the connection end 50a of the manifold 50 and the drip tray 51 is to be larger than a preset reference value defined by the classification class. Thus, in the present invention, as the height of the drip tray 51 is increased when the central part 18 is vertically extended, the connection end 50a of the manifold 51, which is located upward by the preset reference value or more from drip tray 51 is located upward.

However, the height between the drip tray 51 and the other side of the height difference adjusting unit 53 (a portion connected to the transfer arm 110) may be smaller than the preset reference value. At this time, the height difference adjusting unit 53 is provided separable from the manifold 50, and thus the preset reference value can be satisfied when the height difference adjusting unit 53 is separated from the manifold 50.

Figure 10:
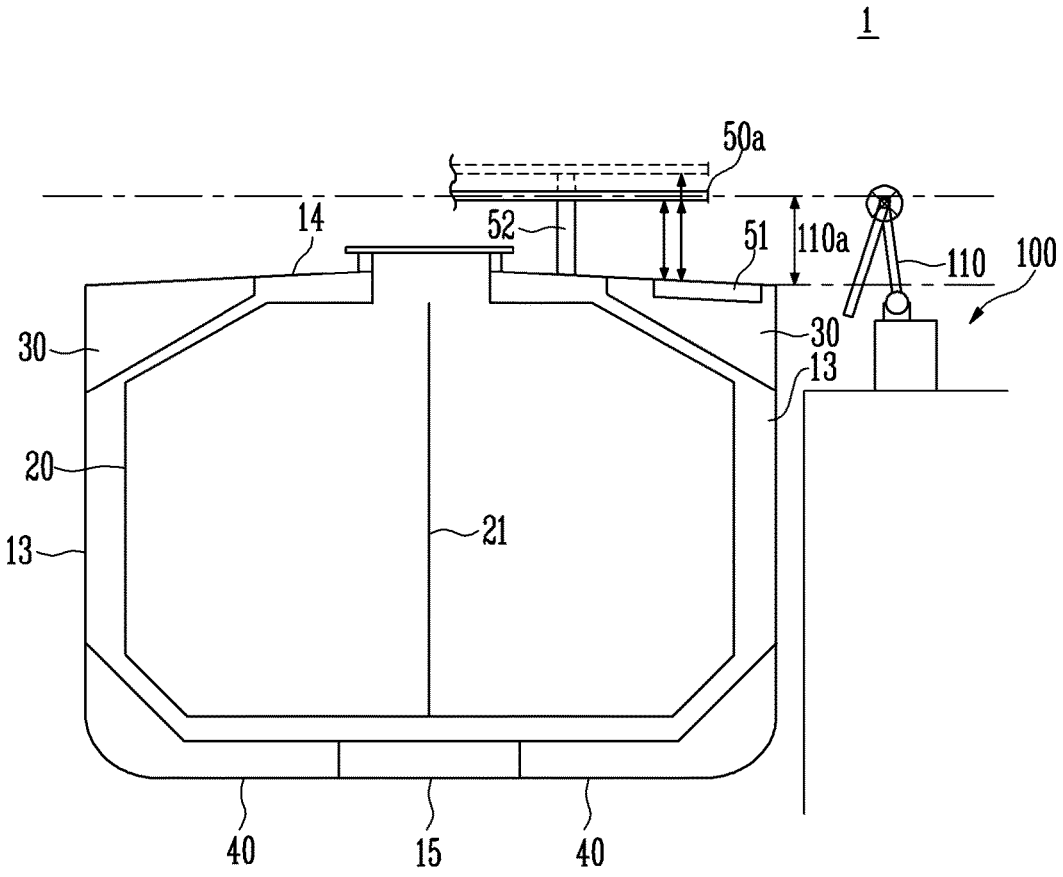
FIG. 10 is a front sectional view of a liquefied gas carrier according to a second embodiment of the present invention.

FIG. 10 is a front sectional view of a liquefied gas carrier according to a second embodiment of the present invention.

Referring to FIG. 10, the liquefied gas carrier 1 according to the second embodiment of the present invention includes a manifold 50 and a drip tray 51. Hereinafter, in this embodiment, portions different from those of the above-described embodiment will be mainly described, and descriptions omitted herein will be replaced with those of another embodiment.

In this embodiment, the height of the drip tray 51 may be decreased such that the height between the manifold 50 and the drip tray 51 is equal to or larger than the preset reference value. That is, the drip tray 51 may be recessed at the upper deck 14.

In this embodiment, the height of the drip tray 51 is decreased, so that the height of the manifold 50 can be provided at the maximum height where the transfer arm 110 can be connected to the manifold 50 or provided lower than the maximum height. At this time, the drip tray 51 may have a recessed shape such that it protrudes to the inside of the top side tank 30 when being disposed on an upper surface of the top side tank 30.

However, when liquefied gas is leaked from the drip tray 51, low-temperature heat may be transferred to the inside of the top side tank 30. Therefore, one surface of the top side tank 30, at which the drip tray 51 is provided, may be made of a material (e.g., LT steel, etc.) strong against low temperature. This may be applied when the drip tray 51 is directly installed at the upper deck 14 without any support in other embodiments.

As described above, in this embodiment, the drip tray 51 is provided in the recessed shape, so that the height of the manifold 50 can become a height at which the transfer arm 110 is connected to the manifold 50 while the height between the drip tray 51 and the manifold 50 is being maintained as the preset reference value or more.

Figure 11:
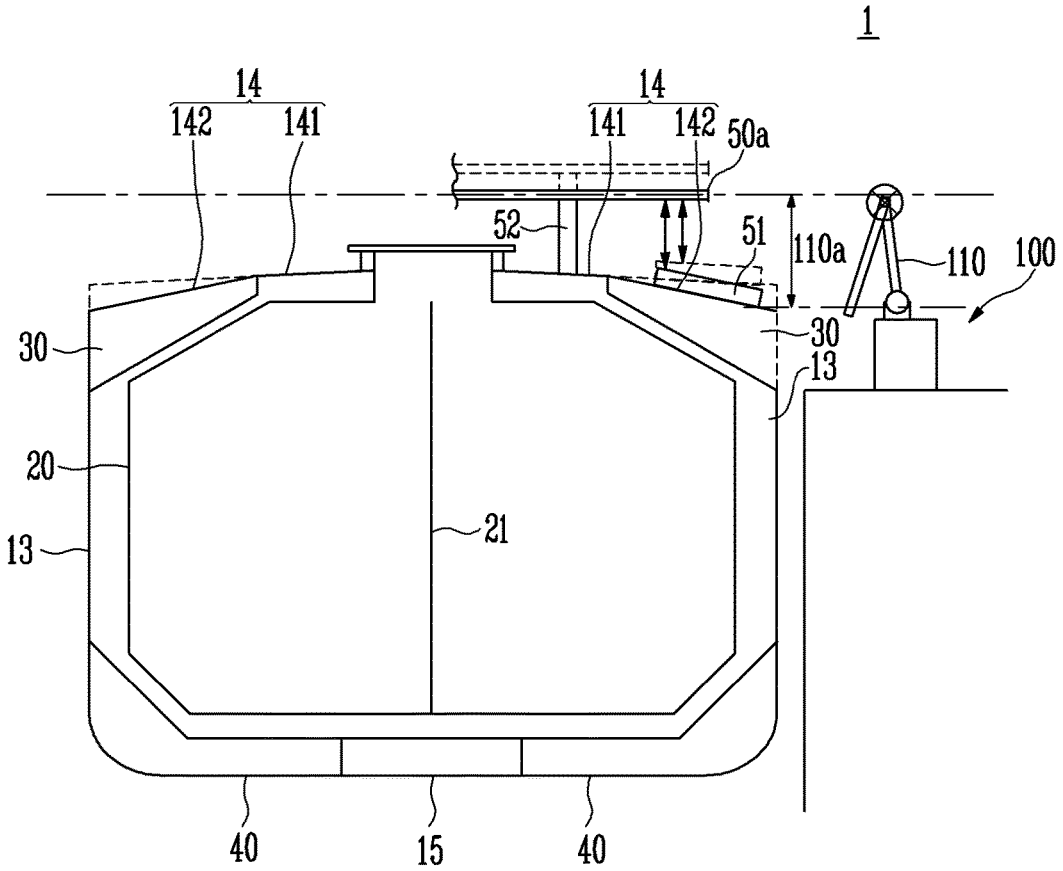
FIG. 11 is a front sectional view of a liquefied gas carrier according to a third embodiment of the present invention.

FIG. 11 is a front sectional view of a liquefied gas carrier according to a third embodiment of the present invention.

Referring to FIG. 11, the liquefied gas carrier 1 according to the third embodiment of the present invention includes a manifold 50 and a drip tray 51. In particular, the shape of the upper deck 14 may be differentiated from those of other embodiments.

In this embodiment, the upper deck 14 has a slope where its height decreases from the center to both sides of the body 10, and the slope of a portion of the upper deck 14, above which the connection end 50a of the manifold 50 is disposed may be relatively larger than that of the other portion of the upper deck 14.

Specifically, the upper deck 14 may include a first slope part 141 and a second slope part 142. The first slope part 141 is a part of which slope is constant from the center to a certain portion, and the second slope part 142 is a part of which slope is constant from the first slope part 141 to the side shell 13. At this time, the slope of the second slope part 142 may be larger than that of the first slope part 141, and the second slope part 142 may be connected to the first slope part 141 while being curved or bent.

One side of the second slope part 142, which is adjacent to the first slope part 141, may be placed at a spot where the top side tank 30 starts being provided between the center and a side of the body 10.

In addition, the second slope part 142 may be partially provided at only a portion at which the manifold 50 is located along the longitudinal direction of the body 10. In this case, the height of a portion of the side shell 13, which is connected to the second slope part 142 may be relatively lower than that of the side shell 13 at the front or rear of the second slope part 142 (the height of the side shell 13 at a portion at which the second slope part 142 does not exist because the manifold 50 is not located) as shown in FIG. 1.

At this time, the side shell 13 may have a shape of which height is gradually decreased from the front or rear of the second slope part 142 to the portion connected to the second slope part 142. That is, when the body 10 is viewed from a side, the side shell 13 may have a shape that is recessed downward while its height is being decreased at only the portion at which the second slope part 142 is provided.

The connection end 50a of the manifold 50 may be located upward from the second slope part 142, and the drip tray 51 may be provided at the second slope part 142. In this embodiment, the height of the connection end 50a of the manifold 50 is equal to or smaller than the height at which the transfer arm 110 can be connected to the manifold 50, and the height between the manifold 50 and the drip tray 51 can satisfy the preset reference value.

This is because, as the second slope part 142 is provided further inclined than the first slope part 141, the height of the drip tray 51 located at the second slope part 142 is relatively lower than those of other embodiments.

Thus, in this embodiment, the height of the manifold 50 is decreased while securing a liquefied gas storage capacity of 75K or more, so that the height difference adjusting unit 53 can be omitted. Simultaneously, the height between the manifold 50 and the drip tray 51 is equal to or larger than the preset reference value, so that the safety of the liquefied gas carrier 1 can be ensured.

As described above, through the structural modification, the manifold 50 and the transfer arm 110 can be connected to each other in the state in which the height between the manifold 50 and the drip tray 51 is equal to or larger than the preset reference value, and/or the manifold 50 can be connected to the transfer arm 110 by controlling draft in the body 10.

The liquefied gas carrier 1 according to the present invention includes a aft peak tank 121 at the stern 12. The aft peak tank 121 generally maintains an empty state when the manifold 50 is connected to the transfer arm 110.

However, in the present invention, the draft in the body 10 may increase by allowing a fluid to be introduced into the aft peak tank 121 so as to connect the connection end 50a of the manifold 50 and the transfer arm 110 of the exterior 100. In this case, the connection end 50a of the manifold 50 may be placed relatively upward from the maximum height at which the transfer arm 110 can be connected thereto.

That is, in the present invention, as the height between the manifold 50 and the drip tray 51 is equal to or larger than the preset reference value while the central part 18 is being extended, the fluid may be introduced into the aft peak tank 121 so as to connect the manifold 50 and the transfer arm 110 when the connection end 50a of the manifold 50 is disposed at a height at which it is difficult for the connection end 50a of the manifold 50 to be connected to the transfer arm 110.

In this case, as the draft in the body 10 increases, the connection end 50a of the manifold 50 may descend to be placed relatively downward from the maximum height at which the transfer arm 110 can be connected thereto.

Thus, in the present invention, although the connection end 50a of the manifold 50 is provided at a position higher than that of the transfer arm 110, the manifold 50 can be stably connected to the transfer arm 110 by controlling the draft in the body 10 in place of structural modification or together with structural modification.

It will be apparent that the draft in the body 10 may be controlled not only by allowing the fluid to be filled in the aft peak tank 121 but also by allowing the fluid to be introduced into the top side tank 30 and the double bottom tank 40. However, although the fluid is introduced into the top side tank 30 and the double bottom tank 40 except the aft peak tank 121, the connection end 50a of the manifold 50 may be placed upward from the height at which the transfer arm 110 can be connected thereto. That is, in the present invention, as the aft peak tank 121 is used, the connection between the manifold 50 and the transfer arm 110 can be implemented.

Figure 12A:
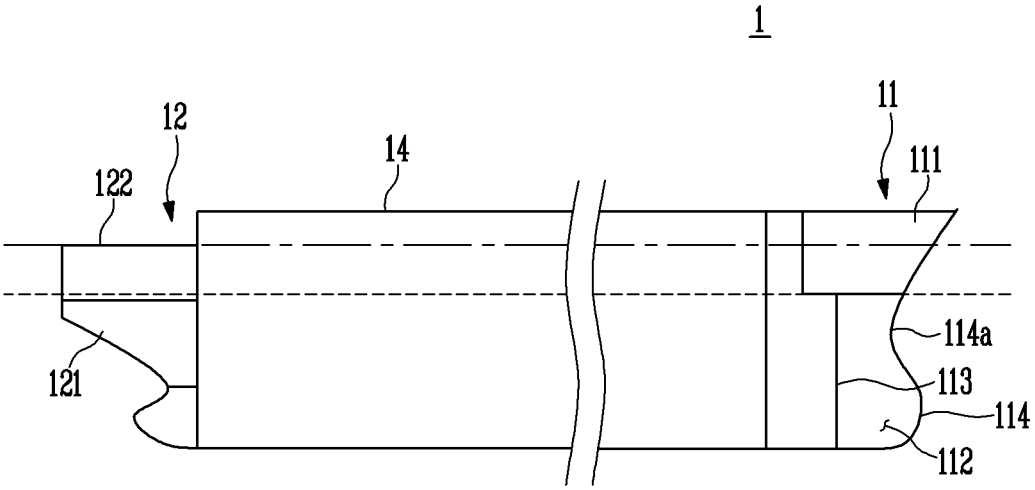
FIG. 12 is a side view of a liquefied gas carrier according to a fourth embodiment of the present invention.
Figure 12B:
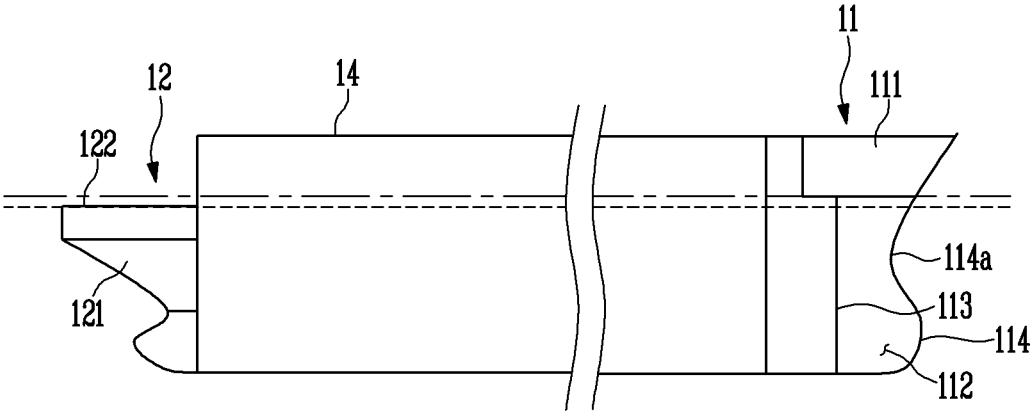

FIG. 12 is a side view of a liquefied gas carrier according to a fourth embodiment of the present invention.

Referring to FIG. 12, the liquefied gas carrier 1 according to the fourth embodiment of the present invention includes a bosun store 111, a sunken deck 122, and an impact preparation barrier 113.

The bosun store 111 is provided at the bow 11 and serves as a storage for keeping various kinds of products. The bosun store 111 is a place that is first damaged when an impact is applied to the front end of the upper deck 14, and therefore, a highly dangerous material, etc. may not be disposed in the bosun store 111.

The sunken deck 122 is provided at the stern 12, and an apparatus for moorage is provided on the sunken deck 122. Since the sunken deck 122 is a part exposed to the exterior 100, the moorage of the stern 12 may be performed by a winch, etc., which is placed on the sunken deck 122.

The sunken deck 122 may be provided to have a height difference from the upper deck 14. That is, the sunken deck 122 may be located relatively lower than the maximum height of the upper deck 14. In this case, the height at which the sunken deck 122 is provided may become the height of a freeboard deck.

The impact preparation barrier 113 is provided downward from the bosun store 111 in the transverse direction of the body 10. The impact preparation barrier 113 is made of a member that is thicker than other portions and/or has a high strength, and may be provided to protect rear components (e.g., liquefied gas tank 20 and the like) from an impact applied to the bow 11.

A fore peak tank 112 may be further included between the impact preparation barrier 113 and the bow 11. The fore peak tank 112 may be a tank for storing ballast water such as seawater. The fore peak tank 112 may be used together with the aft peak tank 121 described above to connect the manifold 50 to the transfer arm 110.

According to rules including the classification class, the height of the upper end of the impact preparation barrier 113 is to be relatively higher than that of the freeboard deck. However, when the height of the sunken deck 122 is higher than the lower surface of the bosun store 111 as shown in (A) of FIG. 12, the rear surface of the bosun store 111 is also to be provided as the impact preparation barrier 113 such that the height of the upper end of the impact preparation barrier 113 is higher than that of the freeboard deck.

However, when the height of the sunken deck 122 is lower than the lower surface of the bosun store 111 as shown in (B) of FIG. 12, the bosun store 111 is located higher than the freeboard deck, and thus it is unnecessary for the rear surface of the bosun store 111 to be provided as the impact preparation barrier 113.

In this case, it is sufficient that the impact preparation barrier 113 is provided from the bottom 15 to the lower surface of the bosun store 111. That is, in this embodiment, the impact preparation barrier 113 may have a planar shape provided vertically from the bottom 15 to the lower surface of the bosun store 111.

According to the configuration described above, in this embodiment, the use of the high-priced impact preparation barrier 113 made of a material that is thick and has a high strength is minimized, thereby reducing the entire manufacturing cost.

Figure 13:
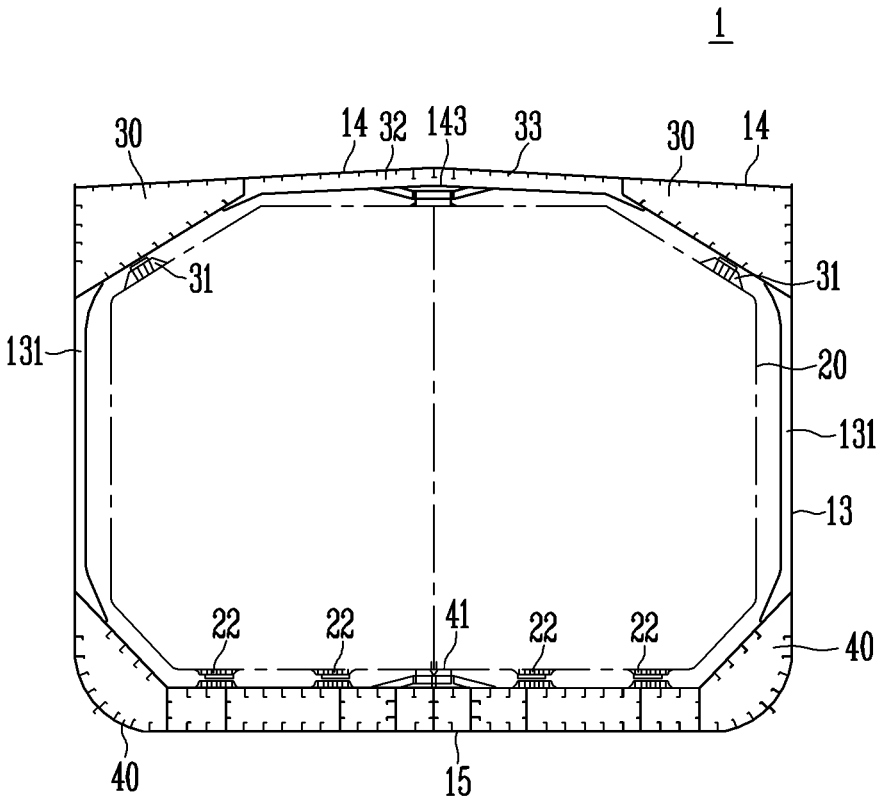
FIG. 13 is a front sectional view of a liquefied gas carrier according to a fifth embodiment of the present invention.

FIG. 13 is a front sectional view of a liquefied gas carrier according to a fifth embodiment of the present invention.

Hereinafter, in the fifth embodiments, portions different from those of the first embodiment will be mainly described with reference to FIG. 13.

Referring to FIG. 13, in the liquefied gas carrier 1 according to this embodiment, the central cross member 32 may be provided at an upper portion of the upper deck 14. As the central cross member 32 is provided at the upper portion of the upper deck 14, the anti-rolling chock 143 between the upper deck 14 and the upper surface of the liquefied gas tank 20 may be directly installed at the lower surface of the upper deck 14. It will be apparent that the reinforcing member 33 may also be provided in the central cross member 32 located at the upper portion of the upper deck 14.

In this embodiment, the central cross member 32 is disposed at the upper portion of the upper deck 14, so that the anti-rolling chock 143 is directly installed at the lower surface of the upper deck 14. Thus, a space between the upper deck 14 and the upper surface of the liquefied gas tank 20 can be additionally secured, and the height of the upper surface of the liquefied gas tank 20 is further increased as compared with the first embodiment.

As an example, the height of the upper surface of the liquefied gas tank 20 may be provided higher than that of the upper end of one surface of the top side tank 30, at which the anti-floating chock 31 is provided. Thus, in the present invention, the height of the upper surface of the liquefied gas tank 20 is increased closer to the upper deck 14, thereby increasing the liquefied gas storage capacity of the liquefied gas tank 20.

However, in the first embodiment, the central cross member 32 is directly connected to the top side tank 30, thereby reinforcing strength. On the other hand, in this embodiment, the central cross member 32 and the top side tank 30 are indirectly connected with the upper deck 14 interposed therebetween, and hence the strength may be changed. At this time, in this embodiment, at least one portion of the lower surface of the central cross member 32 overlaps with the upper surface of the top side tank 30 with the upper deck 14 interposed therebetween, thereby reinforcing the strength.

As described above, in this embodiment, the central cross member 32 connecting the pair of top side tanks 30 is disposed at the upper surface of the upper deck 14, so that the height of the liquefied gas tank 20 can be further increased, thereby increasing the liquefied gas storage capacity of the liquefied gas tank 20.

Figure 14:
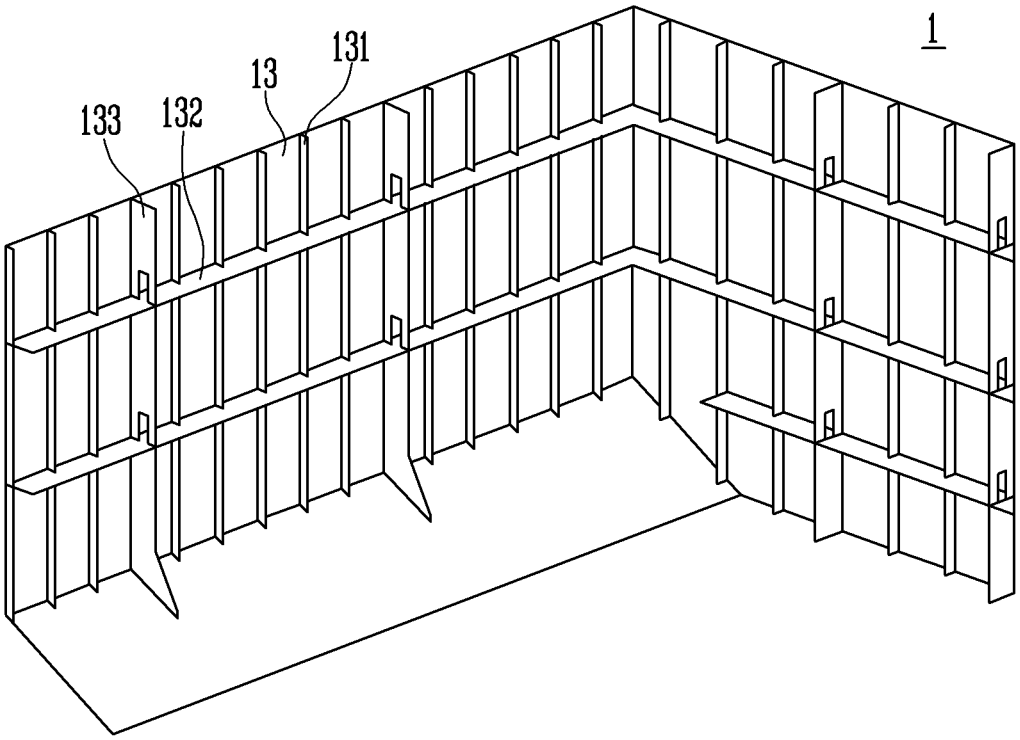
FIGS. 14 and 15 are internal perspective views of a liquefied gas carrier according to a sixth embodiment of the present invention.
Figure 15:
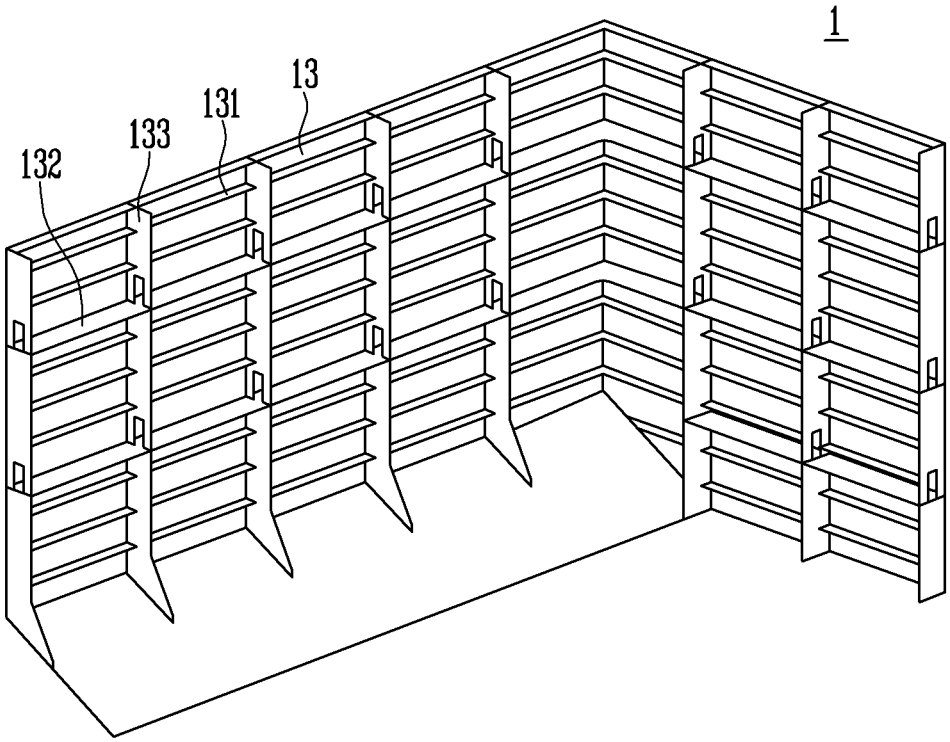

FIGS. 14 and 15 are internal perspective views of a liquefied gas carrier according to a sixth embodiment of the present invention.

In the first embodiment, the stiffener 131 is provided at the inner surface of the side shell 13 provided in the single hull in the vertical direction so as to reinforce the strength of the side shell 13 surrounding the liquefied gas tank 20.

However, in a process of drying the liquefied gas carrier 1, a member on which a person can stand is to be provided so as to test the outer surface of the liquefied gas tank 20. Therefore, an inspection platform (not shown) may be installed perpendicular to the stiffener 131 in the horizontal direction. At this time, the inspection platform may be temporarily installed and be removed later.

In this embodiment, the stiffener 131 is provided in the vertical direction. Therefore, when the side shell 13 is connected by welding between blocks, welding flame may fall along a space between two stiffeners 131. At this time, when the welding flame is in contact with a heat insulating material such as polyurethane, which is installed at the outer surface of the liquefied gas tank 20, a fire occurs, which may cause a serious accident.

Thus, in order to solve this problem, the present invention includes a sixth embodiment. Hereinafter, in the sixth embodiment, portions different from those of the first embodiment will be described in detail with reference to FIGS. 14 and 15.

Referring to FIGS. 14 and 15, the liquefied gas carrier 1 according to the sixth embodiment of the present invention may include a stiffener 131, a deck stringer 132, and a vertical web 133.

The stiffener 131 is provided in plurality to the side shell 13, and the plurality of stiffeners 131 may be arranged in parallel to one another. The stiffener 131 may be provided to the side shell 13 in the vertical direction as shown in FIG. 14, or be provided to the side shell 13 in the horizontal direction as shown in FIG. 15.

The deck stringer 132 is provided to the side shell 13 in the horizontal direction. The deck stringer 132 may be disposed perpendicular to the stiffener 131 as shown in FIG. 14, or be disposed in parallel to the stiffener 131 as shown in FIG. 15.

In this embodiment, as the deck stringer 132 is installed at the side shell 13, the deck stringer 132 may serve as the inspection platform. Thus, in this embodiment, it is unnecessary to perform a process of separately installing the inspection platform and then removing the inspection platform, and accordingly, the number of processes can be reduced.

Also, the deck stringer 132 may function to block welding frame from falling. Thus, when the welding between blocks is performed, it is less likely that a fire will occur when welding flame generated in connection of the side shell 13 falls down.

In FIG. 14, the stiffener 131 and the deck stringer 132 are disposed in a lattice shape, and thus the strength of the side shell 13 can be remarkably enhanced due to the installation of the deck stringer 132. On the contrary, the strength is not enhanced, but the width of the stiffener 131 in the transverse direction may be small as compared with the first embodiment. Accordingly, the cost occurring in the installation of the stiffener 131 can be reduced.

However, in FIG. 15, the stiffener 131 and the vertical web 133 are disposed in a lattice shape. Thus, the width of the stiffener 131 in the transverse direction can be decreased, and the manufacturing cost can be reduced.

Therefore, the width of the stiffener 131 in the transverse direction may be relatively smaller than the width of the deck stringer 132 in the transverse direction and the width of the vertical web 133 in the transverse direction.

The vertical web 133 is provided to the side shell 13 in the vertical direction, and is disposed perpendicular to the deck stringer 132. A hole (reference numeral is not shown) may be provided in the vertical web 133. The hole is used to enable a person moving along the deck stringer 132 to pass therethrough.

The vertical web 133 may be disposed in parallel to the stiffener 131 as shown in FIG. 14, or be disposed perpendicular to the stiffener 131 as shown in FIG. 15.

The width of the vertical web 133 in the transverse direction may correspond to that of the deck stringer 132 in the transverse direction. That is, in this embodiment, the deck stringer 132 and the vertical web 133 are provided in the lattice shape, and accordingly, the number of stiffeners 131 and/or the width in the transverse direction can be reduced. Thus, the manufacturing cost can be reduced, and the total weight of the body 10 can be reduced.

Figure 16:
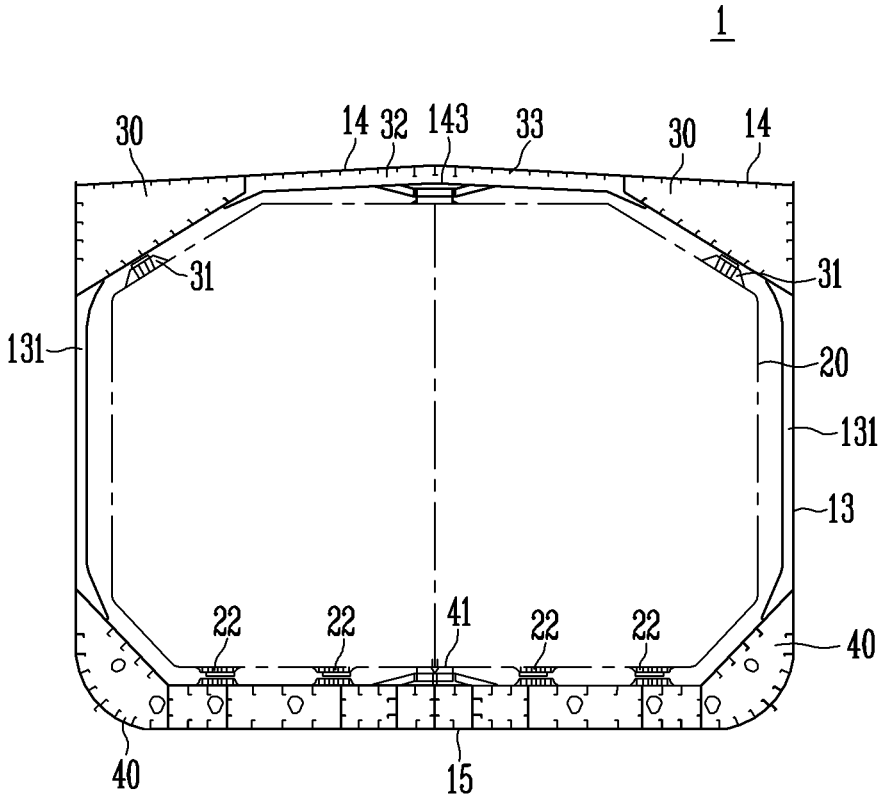
FIG. 16 is a front sectional view of a liquefied gas carrier according to a seventh embodiment of the present invention.
Figure 17:
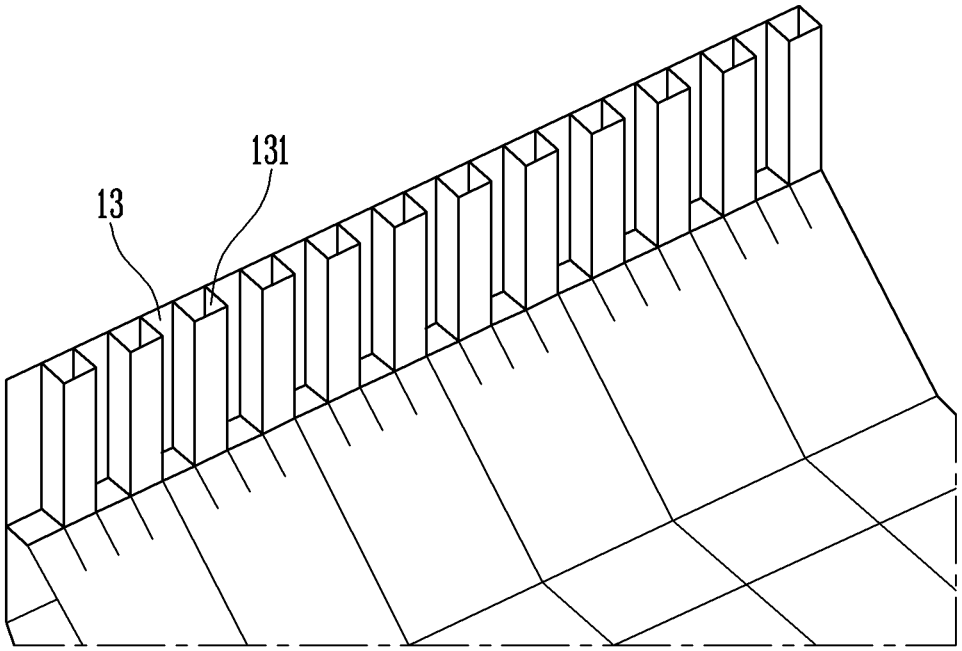
FIG. 17 is an internal perspective view of the liquefied gas carrier according to the seventh embodiment of the present invention.

FIG. 16 is a front sectional view of a liquefied gas carrier according to a seventh embodiment of the present invention. FIG. 17 is an internal perspective view of the liquefied gas carrier according to the seventh embodiment of the present invention.

Referring to FIGS. 16 and 17, in the liquefied gas carrier 1 according to the seventh embodiment of the present invention, the shape of a stiffener 131 may be differentiated from those of other embodiments. Hereinafter, in this embodiment, portions different from those of other embodiments will be mainly described.

The stiffener 131 is provided in plurality to the side shell 13 in vertical direction, and the plurality of stiffeners 131 may be arranged in parallel to one another. At this time, the stiffener 131 may form a polygonal planar section together with the side shell 13 by a certain height.

The stiffener 131 may have a polygonal planar section having an opened side. At this time, the stiffener 131 may be coupled to the side shell 13 such that the opened side on the planar section is sealed by the side shell 13.

Therefore, a space closed by a certain height may be formed by the coupling of the stiffener 131 and the side shell 13. The corresponding space may be a fluid storage space for storing ballast water. That is, the stiffener 131 may form a fluid storage space while being coupled to the side shell 13.

In this case, in this embodiment, a space capable of storing ballast water may be additionally secured, and/or the size of another space capable of storing ballast water may be reduced.

As an example, in this embodiment, the size of the top side tank 30 and/or the double bottom tank 40 may be reduced as compared with other embodiments, and the height of the liquefied gas tank 20 may be increased while reducing the height of the top side tank 30, thereby increasing the liquefied gas storage capacity of the liquefied gas tank 20.

The upper end of the stiffener 131 may be connected to the top side tank 30, and the lower end of the stiffener 131 may be connected to the double bottom tank 40. Therefore, the stiffener 131 may form a fluid storage space between the top side tank 30 and the double side tank 40.

At this time, the fluid storage space may communicate with the top side tank 30 and/or the double bottom tank 40. Alternatively, the fluid storage space may be connected to the top side tank 30 and/or the double bottom tank 40 such that the communication is controlled by a valve (not shown), etc.

Figure 18:
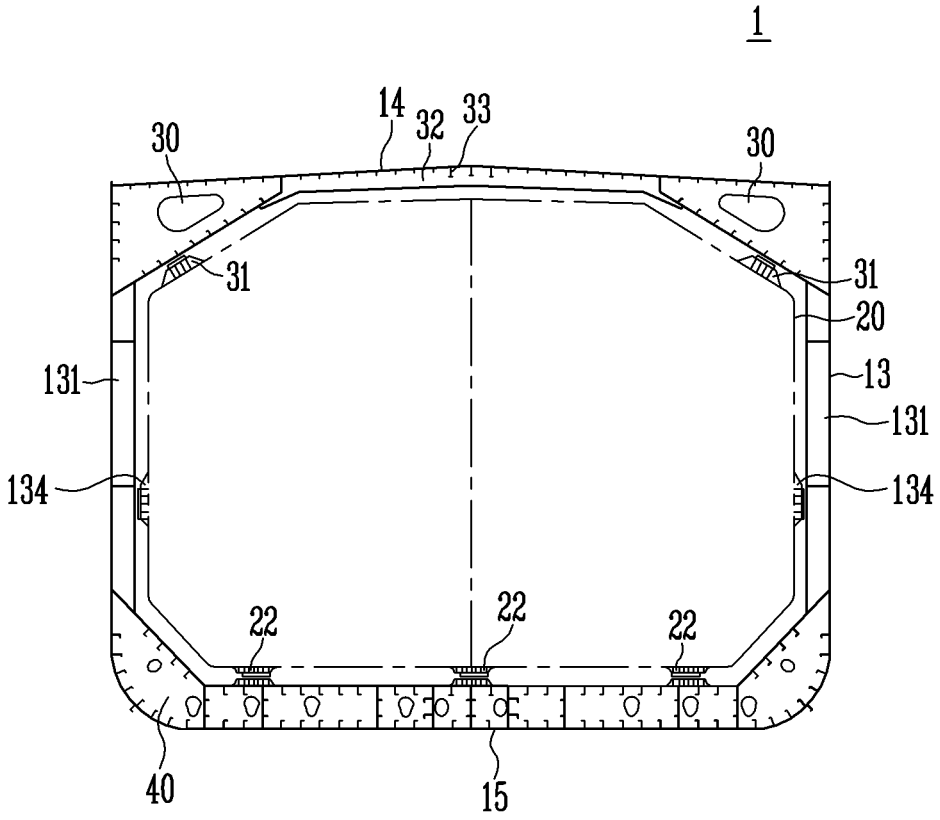
FIG. 18 is a front sectional view of a liquefied gas carrier according to an eighth embodiment of the present invention.

FIG. 18 is a front sectional view of a liquefied gas carrier according to an eighth embodiment of the present invention.

Referring to FIG. 18, the liquefied gas carrier 1 according to the eighth embodiment of the present invention may include an anti-rolling chock 134 provided to the stiffener 131.

The anti-rolling chocks 41 and 143 may be provided between the upper end of the liquefied gas tank 20 and the upper deck 14 and between the lower end of the liquefied gas tank 20 and the bottom 15 as described in the first embodiment.

However, in this embodiment, the anti-rolling chock 134 is provided to the stiffener 131 installed at the side shell 13, and the anti-rolling chock 41 or 143 may be omitted between the upper end of the liquefied gas tank 20 and the upper deck 14 and/or between the lower end of the liquefied gas tank 20 and the bottom 15.

In this case, the height of the upper end of the tank 20 is further increased under the upper deck 14, and thus the liquefied gas storage capacity of the liquefied gas tank 20 can be increased.

The anti-rolling chock 134 provided to the stiffener 131 may be provided at a position relatively close to the bottom 15 between the upper deck 14 and the bottom 15. Also, in this embodiment, the anti-rolling chock 134 may be provided to the vertical web 133 described above.

Any one of the vertical supports 22 provided at the lower end of the liquefied gas tank 20 may be provided at the center of the liquefied gas tank 20 in the transverse direction, and the other vertical supports 22 may be provided bilaterally symmetric with respect to the center of the liquefied gas tank 20 in the transverse direction.

In the first embodiment, as the anti-rolling chock 41 is placed at the center of the liquefied gas tank 20 in the transverse direction between the lower end of the liquefied gas tank 20 and the bottom 15, the vertical support 22 does not support the center of the liquefied gas tank 20 in the transverse direction.

However, in this embodiment, the weight of the liquefied gas tank 20 can be supported at the center of the liquefied gas tank 20 in the transverse direction, and thus the number of vertical supports 22 can be decreased (e.g., the number of vertical supports 22 is decreased to 3 from 4 on one section in the transverse direction).

Thus, in this embodiment, as the anti-rolling chock 134 is provided to the stiffener 131, the anti-rolling chocks 41 and 143 provided on the top and bottom of the liquefied gas tank 20 are omitted, and the number of vertical supports 22 can be decreased by changing the arrangement of the vertical supports 22.

Further, in this embodiment, as the anti-rolling chock 143 is omitted at the upper end of the liquefied gas tank 20, the height of the upper end of the liquefied gas tank is increased close to the upper deck 14, thereby increasing the liquefied gas storage capacity of the liquefied gas tank 20.

Figure 19:
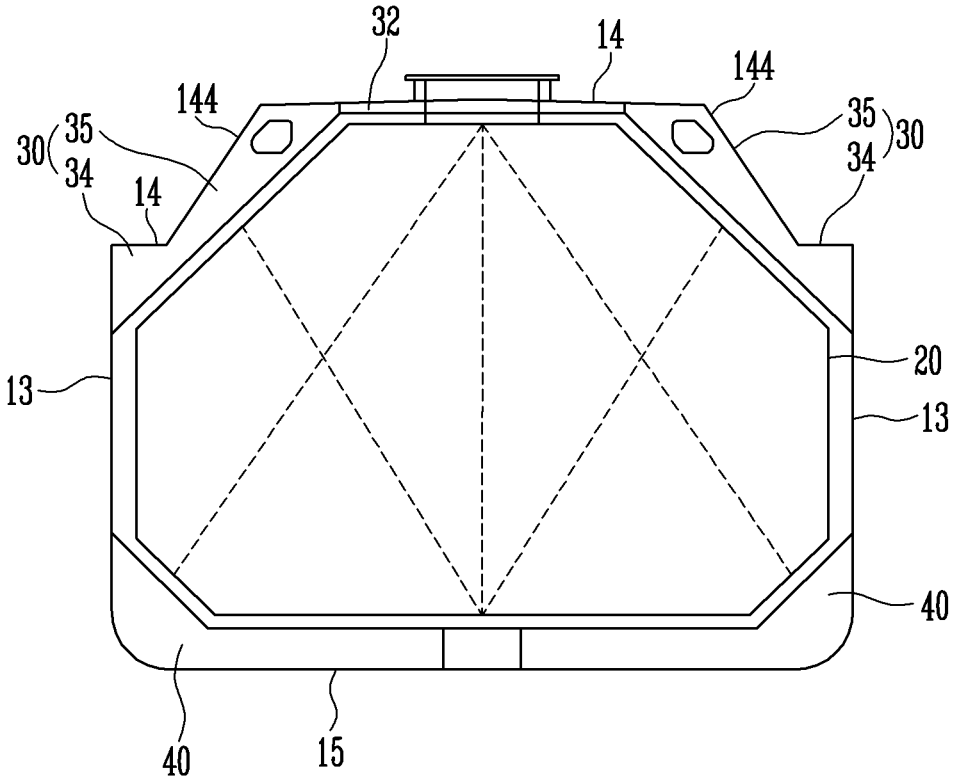
FIG. 19 is a front sectional view of a liquefied gas carrier according to a ninth embodiment of the present invention.

FIG. 19 is a front sectional view of a liquefied gas carrier according to a ninth embodiment of the present invention.

Referring to FIG. 19, the liquefied gas carrier 1 according to the ninth embodiment of the present invention includes a side shell 13, an upper deck 14, and a top side tank 30. Hereinafter, in this embodiment, portions different from those of other embodiments will be mainly described.

The upper deck 14 may have a slope part 144 that is connected to the upper end of the side shell 13 and is upwardly inclined when it comes close to the center of the upper deck 14. However, the slope part 144 may be spaced apart from a spot where the side shell 13 and the upper deck 14 meet each other.

At least one portion of the top side tank 30 may be located upward from the spot where the side shell 13 and the upper deck 14 are connected to each other. In this embodiment, as the upper deck 14 has the slope part 144, the upper deck 14 has a shape protruding sufficiently upwardly. Accordingly, the top side tank 30 provided between the upper end of the side shell 13 and the upper deck 14 can protrude upwardly.

The top side tank 30 protrudes outwards from the spot (e.g., a side upper corner on a cross section of the body 10) where the side shell 13 and the upper deck 14 are connected to each other, and may have a shape recessed inward from the spot where the slope part 144 of the upper deck 14 is started.

The top side tank 30 includes a lower space 34 provided downward from the spot where the side shell 13 and the upper deck 14 are connected to each other and an upper space 35 provided upward from the spot where the side shell 13 and the upper deck 14 are connected to each other. The top side tank 30 may have the maximum width in the transverse direction at the spot where the lower space 34 and the upper space 35 are connected to each other. In addition, the lower space 34 and the upper space 35 may communicate with each other.

At this time, that the lower space 34 and the upper space 35 are communicate with each other includes a case where any structure does not exist between the lower space 34 and the upper space 35, a case where a structure exists between the lower space 34 and the upper space 35 but has a hole formed therein to allow the lower space 34 and the upper space 35 to communicate with each other, and the like.

The upper space 35 of the top side tank 30 may be provided at a lower surface of the slope part 144. The slope part 144 is started from a position closer to the center of the body 10 than the spot where the side shell 13 and the upper deck 14 are connected to each other. The upper deck 14 between a pair of left and right slope parts 144 may be relatively flat or inclined to a slope similar to that of the upper deck 14 of other embodiments.

As the top side tank 30 includes the upper space 35 upwardly protruded by the slope part 144, the width of the top side tank 30 in the transverse direction may be increased toward the center of the body 10 from the side shell 13.

A central cross member 32 is provided between the pair of top side tanks 30. In this embodiment, the width of the central cross member 32 in the transverse direction may be relatively decreased as compared with other embodiments. Thus, in this embodiment, the size of the central cross member 32 can be decreased, thereby reducing installation cost.

In this embodiment, the upper end of the liquefied gas tank 20 may ascend upwardly when the slope of the upper deck 14 is increased upwardly. At this time, the slope of an upper end corner of the liquefied gas tank 20 may be larger than that of a lower end corner of the liquefied gas tank 20.

While the present invention has been described with respect to the specific embodiments, this is for illustrative purposes only, and the present invention is not limited thereto. Therefore, it will be apparent to those skilled in the art that various changes and modifications may be made within the technical spirit and scope of the present invention.

Accordingly, simple changes and modifications of the present invention should also be understood as falling within the present invention, the scope of which is defined in the appended claims and their equivalents.

| [Explanation of Reference Numerals] | |
|---|---|
| 1: Liquefied gas carrier | 10: Body |
| 11: Bow | 12: Stern |
| 13: Side shell | 14: Upper deck |
| 15: Bottom | 16: Upper part |
| 17: Lower part | 18: Central part |
| 20: Liquefied gas tank | 50: Manifold |
| 100: Exterior | 110: Transfer arm |

The invention claimed is:

1. A *higher storage capacity* (*HSC*) liquefied gas carrier having a width of less than 32.3 m to pass through the old Panama Canal, having a liquefied gas storage [capacity of less than 70K cubic meters and ]including a plurality of [liquified] *liquefied* gas tanks;

a body including a lower part having a bottom and a lower end of each of the liquefied gas tanks, an upper part having an upper deck and an upper end of each of the liquefied gas tanks, and a central part provided between the upper part and the lower part and having vertical left and right sides;

a manifold installed at the upper deck for loading or unloading liquefied gas *and comprising a connection end*; and a drip tray provided downward from [a] *the* connection end of the manifold on the upper deck, wherein a total height of the body is *greater than a total height of a body of a conventional liquefied gas carrier by an increased height amount,*

*wherein the conventional liquefied gas carrier has a maximum body width of 32.3 m or less,*

[increased by vertically extending] *wherein the increased height in the total height of the body of the HSC liquefied gas carrier is equal to a vertical extension of* the central part to upwardly move the manifold and the upper part [so that a liquefied gas storage capacity of less than 70K cubic meters], wherein an outside *slope part* of the upper deck where the drip tray is placed is inclined more downwardly than [an inside thereof] *an inner slope part of the upper deck where the connection end of the manifold is placed*, [and]

wherein a height of the central part is greater than a sum of a height of the upper part and a height of the lower part.

2. The *HSC* liquefied gas carrier of claim 1, wherein the height of the body is 22 m to 23.5 m.

3. The *HSC* liquefied gas carrier of claim 1, [wherein] *further including* a *side* shell *provided at a side* of the body*, wherein the side shell* is provided in a single hull.

4. The *HSC* liquefied gas carrier of claim 1, wherein the liquefied gas tanks include a first liquefied gas tank disposed at a bow, and wherein the first liquefied gas tank has [at least two bending parts] *a side surface which is bent twice*.

5. The *HSC* liquefied gas carrier of claim 1, wherein each of the liquefied gas tanks includes an upper part, a central part, and a lower part, and wherein a vertical length of the central part of each of the liquefied gas tank is formed to further extend than that of a central part of a liquefied gas tank of [a] *the*

*conventional* liquefied gas carrier having a liquefied gas storage capacity of less than 70K cubic meters.

6. The *HSC* liquefied gas carrier of claim 5, wherein vertical lengths of the upper part and the lower part of each liquefied gas tank are formed equal to those of an upper part and a lower part of [a] *the* liquefied gas tank of [a] *the conventional* liquefied gas carrier having [a] *the* liquefied gas storage capacity of less than 70K cubic meters.

7. The *HSC* liquefied gas carrier of claim 1, *further including a side shell provided at a side of the body,* wherein each of the liquefied gas tanks is disposed to be spaced apart from [a] *the side* shell of the body at 1.4 m or more.

* * * * *